US008817406B2

(12) United States Patent
Das et al.

(10) Patent No.: US 8,817,406 B2
(45) Date of Patent: Aug. 26, 2014

(54) MAGNETIC-RECORDING HEAD WITH TOUCH-DOWN DETECTOR INCORPORATING A CARBON NANO-TUBE

(75) Inventors: Sarbanoo Das, Kanagawa (JP); Masafumi Mochizuki, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 194 days.

(21) Appl. No.: 13/341,755

(22) Filed: Dec. 30, 2011

(65) Prior Publication Data

US 2013/0170070 A1 Jul. 4, 2013

(51) Int. Cl.
*G11B 5/187* (2006.01)

(52) U.S. Cl.
USPC .................. 360/55; 360/235.1; 360/234.3

(58) Field of Classification Search
None
See application file for complete search history.

(56) References Cited

U.S. PATENT DOCUMENTS

| | | | |
|---|---|---|---|
| 7,158,325 B1 | 1/2007 | Hu et al. | |
| 7,286,315 B2 | 10/2007 | Ryu | |
| 7,423,830 B2 | 9/2008 | Ma et al. | |
| 7,796,356 B1 | 9/2010 | Fowler et al. | |
| 7,800,858 B1 | 9/2010 | Bajikar et al. | |
| 2005/0254168 A1* | 11/2005 | Inomata | 360/122 |
| 2007/0127147 A1 | 6/2007 | Yokohata et al. | |
| 2007/0236821 A1 | 10/2007 | Ma et al. | |
| 2012/0120519 A1* | 5/2012 | Kunkel et al. | 360/59 |

OTHER PUBLICATIONS

Mavroidis, D., et al., "Flexible Carbon Nanotube Based Temperature Sensor for Ultra-Small-Site Applications", http://www.google.co.in/url?sa=t&source=web&cd=2&ved=0CCEQFjAB&url=http%3A%2F%2Fwww.coe.neu.edu%2FGroups%2Fmimecap%2FPastProjects%2F2007_F%2FExecSummF_07%2FCarbon%2520Nanotube%2520Based%2520Temperature%2520Sensor_Executive%2520Summary.doc&ei=qiD7TZDoEoPorQ, pp. 1-6.
Fatikow, Sergej et al., "Depth-Detection Methods for CNT Manipulation and Characterization in a Scanning Electron Microscope", http://ieeexplore.ieee.org/search/srchabstract.jsp?tp=&arnumber=4303514&queryText%3DDepth-Detection+Methods+for+CNT+Manipulation+and+Characterization+in+a+Scanning+Electron+Microscope%26openedRefinements%3D*%26searchField%3DSearch+All, 2007, pp. 45-50.
Sinha, Niraj et al., "Carbon Nanotube-Based Sensors", http://biomems.uwaterloo.ca/papers/JNN.pdf, 2006, pp. 573-590.

* cited by examiner

*Primary Examiner* — Wayne Young
*Assistant Examiner* — Brian Butcher

(57) ABSTRACT

A magnetic-recording head with touch-down detector incorporating a carbon nano-tube (CNT). The magnetic-recording head includes a write element, a read element and a touch-down detector. The write element is configured to write data to a magnetic-recording disk. The read element is configured to read data from the magnetic-recording disk. The touch-down detector includes a thermal sensor, and a CNT portion. The thermal sensor is configured to convert heat to a voltage signal. The CNT portion is configured to touch down on the magnetic-recording disk. The CNT portion is also coupled to the thermal sensor, and is configured to transfer heat generated by contact between the CNT portion and the magnetic-recording disk to the thermal sensor. A hard-disk drive (HDD) including the magnetic-recording head with touch-down detector incorporating a CNT, and a method for detecting contact between the magnetic-recording head and a recording surface of a magnetic-recording disk are also provided.

22 Claims, 16 Drawing Sheets ns8817406B2

MAGNETIC-RECORDING HEAD WITH TOUCH-DOWN DETECTOR INCORPORATING A CARBON NANO-TUBE

TECHNICAL FIELD

Embodiments of the present invention relate generally to hard-disk drives (HDDs), and in particular to means for detecting when a magnetic-recording head makes contact with a magnetic-recording disk of the HDD.

BACKGROUND

With the advance of HDD technology and the accompanying increases in the areal density of stored information, the magnetic fields read by a magnetic-recording head from the recording surface of a magnetic-recording disk have become progressively smaller. Consequently, flying the magnetic-recording head closer to the magnetic-recording disk by reducing the fly height has become of greater concern. For example, the fly height of the magnetic-recording head in a HDD may be as low as a few nanometers (nm) with the use of thermal fly-height control (TFC). The close proximity of the magnetic-recording head to the magnetic-recording disk raises concerns about head-disk interactions (HDIs) that may be deleterious to HDD performance and reliability. Thus, engineers and scientists engaged in the development of HDDs are interested in providing a HDD environment of high reliability for the retrieval of information that has been stored at high areal density.

SUMMARY

Embodiments of the present invention include a magnetic-recording head with touch-down detector incorporating a carbon nano-tube (CNT). The magnetic-recording head includes a write element, a read element and a touch-down detector. The write element is configured to write data to a magnetic-recording disk. The read element is configured to read data from the magnetic-recording disk. The touch-down detector includes a thermal sensor, and a carbon-nano-tube portion. The thermal sensor is configured to convert heat to a voltage signal. The carbon-nano-tube portion is configured to touch down on the magnetic-recording disk. The carbon-nano-tube portion is also coupled to the thermal sensor, and is configured to transfer heat generated by contact between the carbon-nano-tube portion and the magnetic-recording disk to the thermal sensor. Other embodiments of the present invention include a hard-disk drive (HDD) that includes the magnetic-recording head with touch-down detector incorporating a CNT, and a method for detecting contact between the magnetic-recording head and a recording surface of a magnetic-recording disk in the HDD.

DESCRIPTION OF THE DRAWINGS

The accompanying drawings, which are incorporated in and form a part of this specification, illustrate embodiments of the invention and, together with the description, serve to explain the embodiments of the invention.

Figure 1:
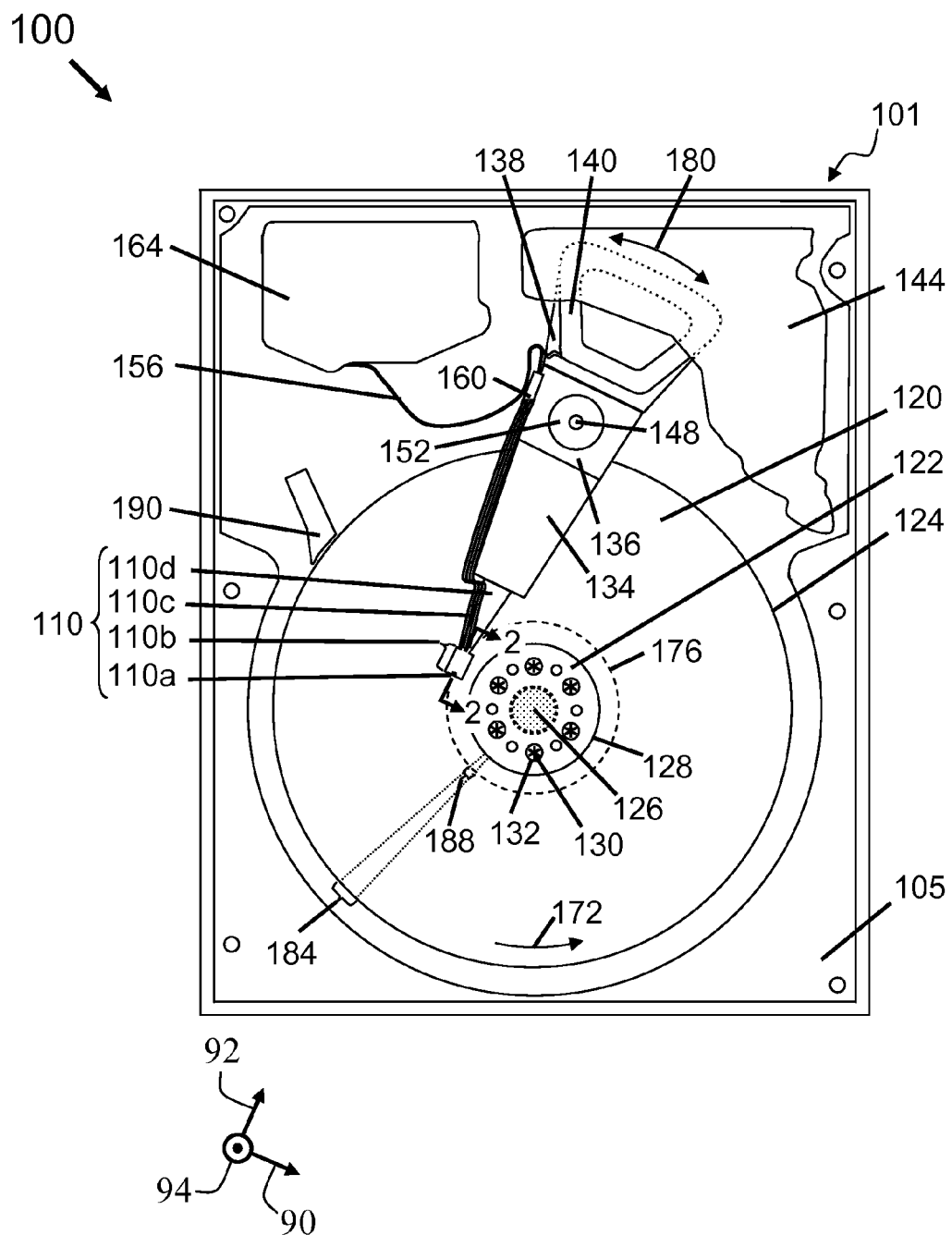
FIG. 1 is a plan view of a hard-disk drive (HDD), with a disk-enclosure cover removed, having a magnetic-recording head with touch-down detector incorporating a carbon nano-tube (CNT), in accordance with one or more embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be appreciated that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Physical Description of Embodiments of a Magnetic-Recording Head with Touch-Down Detector Using a Carbon Nano-Tube The increasing demand for data storage capacity in hard-disk drives (HDDs) has led to the reduction of the physical spacing, referred to by the term of art, "fly height," between a magnetic-recording head and the surface of the magnetic-recording medium of a magnetic-recording disk. Moreover, reduction of the roughness of both the surface of the magnetic-recording head and the surface of the magnetic-recording medium to the nano-scale level has also led to a more reliable head-disk interface. Thus, efficient detection of nano-scale asperities at the surface of the magnetic-recording medium aids in maintaining a constant head-medium spacing and protects the magnetic-recording head from being damaged during read-write operations.

One of the known methods to detect asperities is to use an embedded contact sensor inside the head-slider in which the main part of the embedded contact sensor is made of a magnetic thin film. While flying over the surface of the magnetic-recording medium of the magnetic-recording disk, the embedded contact sensor expands towards the surface of the magnetic-recording medium due to the application of heat from the heater of a thermal fly-height-control (TFC) element in the magnetic-recording head. For a certain voltage applied to the heater, the embedded contact sensor comes into contact with the surface of the magnetic-recording medium and a certain amount of heat is generated. This heat, which is generated due to a head-disk interaction (HDI) of the embedded contact sensor with the surface of the magnetic-recording medium, changes the electrical resistance of the embedded contact sensor; and, the "touch-down", a term of art for HDI, is detected as the change in resistance from an initial resistance value of the embedded contact sensor. For such a detection method, the embedded contact sensor, itself, comes into the direct contact with the surface of the magnetic-recording medium. Thus, this direct-contact method poses a greater risk of damaging the embedded contact sensor, and consequently a greater risk of the detection performance of the embedded contact sensor deteriorating with repeated HDIs.

Thus, embodiments of the present invention provide a method and touch-down detector in which a thermal sensor does not come into direct contact with the surface of the magnetic-recording medium; but rather, the thermal sensor detects the head-medium contact in an effective way by using carbon nanotubes (CNTs) placed in a position close to the air-bearing surface (ABS) of the magnetic-recording head.

As shown in and described in the discussion of FIGS. 1-8 herein, embodiments of the present invention include a magnetic-recording head 110a with touch-down detector incorporating a carbon nano-tube (CNT). The magnetic-recording head 110a includes a write element 110a-5, a read element 110a-4 and a touch-down detector. The write element 110a-5 is configured to write data to a magnetic-recording disk 120. The read element 110a-4 is configured to read data from the magnetic-recording disk 120. The touch-down detector includes a thermal sensor 110a-1, and a carbon-nano-tube (CNT) portion 110a-2. The thermal sensor 110a-1 is configured to convert heat to a voltage signal. The CNT portion 110a-2 is configured to touch down on the magnetic-recording disk 120. The CNT portion 110a-2 is also coupled to the thermal sensor 110a-1, and is configured to transfer heat generated by contact between the CNT portion 110a-2 and the magnetic-recording disk 120 to the thermal sensor 110a-1.

As shown in and described in the discussion of FIG. 1 herein, embodiments of the present invention also include a hard-disk drive (HDD) 101 including the magnetic-recording head 110a with touch-down detector incorporating a CNT. Throughout the following, embodiments of the present invention for the magnetic-recording head 110a with touch-down detector incorporating a CNT may be understood to be also incorporated in the environment of HDD 101.

Figure 9:
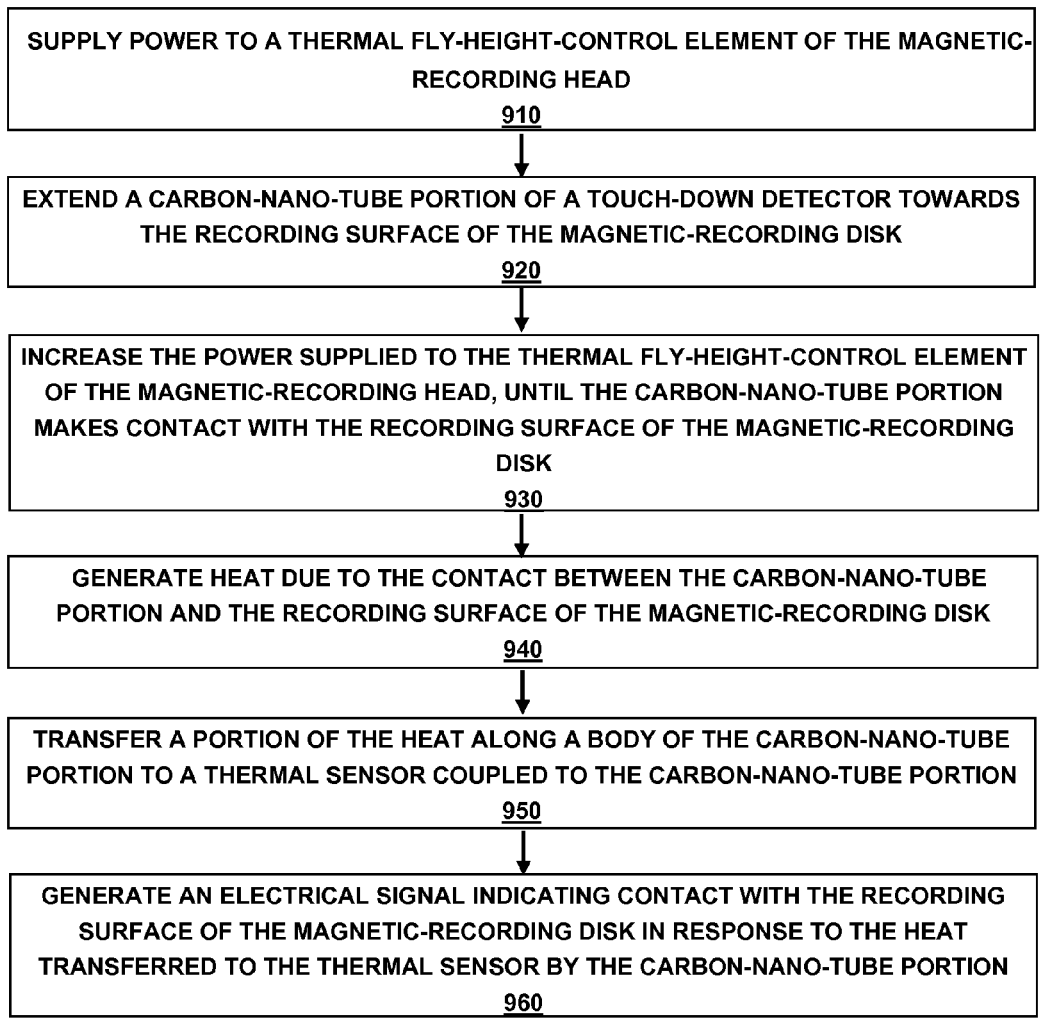
FIG. 9 is a flowchart of a method for detecting contact between a magnetic-recording head and a recording surface of a magnetic-recording disk in a HDD, in accordance with one or more embodiments of the present invention.

Furthermore, as shown in and described in the discussion of FIG. 9 herein, embodiments of the present invention also include a method for detecting contact between the magnetic-recording head and a recording surface of a magnetic-recording disk in the HDD. Throughout the following, embodiments of the present invention for the magnetic-recording head with touch-down detector incorporating a CNT and embodiments of the present invention for the HDD including the magnetic-recording head 110a with touch-down detector incorporating a CNT may be understood as being capable of being incorporated within certain embodiments of the present invention for the method for detecting contact between the magnetic-recording head and a recording surface of a magnetic-recording disk in the HDD.

With reference now to FIG. 1, in accordance with one or more embodiments of the present invention, a plan view 100 is shown of HDD 101 having a magnetic-recording head with touch-down detector incorporating a CNT. As shown in FIG. 1, HDD 101 is shown without the disk-enclosure cover of the disk enclosure. FIG. 1 illustrates the arrangement of components of HDD 101 including the magnetic-recording head 110a and slider 110b. As shown in FIG. 1, a triad of arrows 90, 92 and 94 is used to indicate the relative orientation of components in HDD 101; the direction of arrow 92 is about parallel to the long side of the magnetic-recording head 110a of HDD 101; the direction of arrow 90 is perpendicular to arrow 92 and is about parallel to the short side of the magnetic-recording head 110a; and, arrow 94 is about perpendicular to the plane of the disk-enclosure base 105, as well as the plane of the recording surface of the magnetic-recording disk 120, and therefore is perpendicular to arrows 90 and 92. Thus, the triad of arrows 90, 92 and 94 are related to one another by the right-hand rule for vectors in the direction of the arrows 90, 92 and 94 such that the cross product of the vector corresponding to arrow 90 and the vector corresponding to arrow 92 produces a vector parallel and oriented in the direction of the arrow 94. The triad of arrows 90, 92 and 94 is subsequently used to indicate the orientation of views for subsequently described drawings of the magnetic-recording head 110a and HDD 101. The terms of art, "top," and "bottom," refer to components the principal surfaces of which are disposed about normal to the arrow 94. The term of art, "vertical," refers to a feature that lies about parallel to the arrow 94. The term of art, "lateral," refers to a feature that is about normal to either of the arrows 90 and 92. The term of art, "front," refers to a feature that is about normal to the arrow 92 at the distal end of the magnetic-recording head 110a of FIG. 1; for example, arrow 92 points to the front side of magnetic-recording head 110a as shown in FIG. 1.

Also as, used herein, for a magnetic-recording head 110a that is disposed in a writing and/or reading relationship with the magnetic-recording disk 120, the term of art, "cross-track direction," coincides with the direction of arrow 90; and, similarly, the term of art, "down-track direction," coincides with the direction of arrow 92. Also, throughout the following discussion and in various figures described herein, by way of example, embodiments of the present invention are described with respect to the cross-track direction and the down-track direction, without limitation thereto, as embodiments of the present invention encompass within their spirit and scope orientations and locations of the magnetic-recording head 110a in which it is not disposed in a writing and/or reading relationship with the magnetic recording disk 120. In such cases, the arrows 90, 92 and 94 will be understood to refer to the magnetic-recording head 110a, itself. For example, embodiments of the present invention described with respect to the arrows 90, 92 and 94 such that the magnetic-recording head is disposed outside of the disk enclosure of HDD 101 are also within the spirit and scope of embodiments of the present invention.

With further reference to FIG. 1, in accordance with one or more embodiments of the present invention, HDD 101 includes at least one head-gimbal assembly (HGA) 110 including a magnetic-recording head 110a, a lead-suspension 110c coupled with the magnetic-recording head 110a, and a load beam 110d attached to a slider 110b, to which the magnetic-recording head 110a is attached at a distal end of the slider 110b; the slider 110b is attached at the distal end of the load beam 110d to a gimbal portion of the load beam 110d. HDD 101 also includes a disk enclosure, including a disk-enclosure base 105 and disk enclosure cover (not shown), and at least one magnetic-recording disk 120 rotatably mounted on a spindle 126 and a drive motor (not shown) mounted in the disk-enclosure base 105 and attached to the spindle 126 for rotating the magnetic-recording disk 120. The magnetic-recording head 110a that includes a write element 110a-5, a so-called writer, and a read element 110a-4, a so-called reader, is disposed for respectively writing and reading information, referred to by the term of art, "data," stored on the magnetic-recording disk 120 of HDD 101. The magnetic-recording disk 120, or a plurality (not shown) of magnetic-recording disks, may be affixed to the spindle 126 with a disk clamp 122. The disk clamp 122 includes a circular plate; and, the circular plate includes a plurality of fastener holes, of which fastener hole 130 is an example. The plurality of fastener holes, of which fastener hole 130 is an example, is configured to accept a plurality of fasteners, of which fastener 132 (indicated by the hex-shaped "star" representative of a Torx™ screw) is an example, such that the fasteners are configured to fasten the disk clamp 122 to couple the magnetic-recording disk 120 with the spindle 126. HDD 101 further includes an arm 134 attached to HGA 110, a carriage 136, a voice-coil motor (VCM) that includes an armature 138 including a voice coil 140 attached to the carriage 136; and a stator 144 including a voice-coil magnet (not shown); the armature 138 of the VCM is attached to the carriage 136 and is configured to move the arm 134 and HGA 110 to access portions of the magnetic-recording disk 120, as the carriage 136 is mounted on a pivot-shaft 148 with an interposed pivot-bearing assembly 152. HDD 101 also includes a load-unload ramp 190 for HGA 110 that is configured to engage a tongue (not shown) of HGA 110 at the far distal end of HGA 110 when arm 134 is retracted from a position for flying the magnetic-recording head 110a in proximity with the magnetic-recording disk 120.

With further reference to FIG. 1, in accordance with one or more embodiments of the present invention, electrical signals, for example, current to the voice coil 140 of the VCM, write signals to and read signals from the magnetic-recording head 110a, thermal-fly-height-control (TFC) signals and touch-down-detector signals to and from, respectively, the magnetic-recording head 110a are provided by a flexible cable 156. Interconnection between the flexible cable 156 and the magnetic-recording head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by the disk-enclosure base 105. The disk-enclosure base 105, also referred to as a casting, depending upon whether the disk-enclosure base 105 is cast, in conjunction with a disk-enclosure cover (not shown) provides a sealed, protective disk enclosure for the information storage components of HDD 101.

With further reference to FIG. 1, in accordance with one or more embodiments of the present invention, other electronic components (not shown), including a disk controller and servo electronics including a digital-signal processor (DSP), provide electrical signals to the drive motor, the voice coil 140 of the VCM and the magnetic-recording head 110*a* of HGA 110. The electrical signal provided to the drive motor enables the drive motor to spin providing a torque to the spindle 126 which is in turn transmitted to the magnetic-recording disk 120 that is affixed to the spindle 126 by the disk clamp 122; as a result, the magnetic-recording disk 120 spins in a direction 172. The spinning magnetic-recording disk 120 creates an airflow including an air-stream, and a cushion of air that acts as an air bearing on which the ABS 110*f* (see FIG. 2D) of the slider 110*b* and the magnetic-recording head 110*a* ride so that the slider 110*b* and magnetic-recording head 110*a* fly in proximity with the surface of the magnetic-recording disk 120 with minimal contact between the combined slider 110*b*/magnetic-recording head 110*a*, also referred to by the term of art, "head-slider," and the magnetic-recording disk 120 in which information is recorded. The magnetic-recording head 110*a* may also include a TFC element, which may include a heater, for adjusting the spacing, fly-height, between the magnetic-recording head 110*a* and the magnetic-recording disk 120. The electrical signal provided to the voice coil 140 of the VCM enables the magnetic-recording head 110*a* of HGA 110 to access a track 176 on which information is recorded. Thus, the armature 138 of the VCM swings through an arc 180 which enables HGA 110 attached to the armature 138 by the arm 134 to access various tracks on the magnetic-recording disk 120. As shown in FIG. 1, the cross-track direction of track 176 coincides with the direction of arrow 90, and the down-track direction of track 176 coincides with the direction of arrow 92 only at the location of the magnetic-recording head 110*a*, as the cross-track direction and the down-track direction deviate from the directions of arrows 90 and 92, respectively, as one proceeds away from the magnetic-recording head 110*a* in a circumferential direction along track 176.

With further reference to FIG. 1, in accordance with one or more embodiments of the present invention, information is stored on the magnetic-recording disk 120 in a plurality (not shown) of concentric tracks arranged in sectors on the magnetic-recording disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies a track 176, and error correction code information. In accessing the track 176, the read element 110*a*-4 of the magnetic-recording head 110*a* of HGA 110 reads the servo-burst-signal pattern that provides a position-error-signal (PES) to the servo electronics, which control the electrical signal provided to the voice coil 140 of the VCM, enabling the magnetic-recording head 110*a* to follow the track 176. Upon finding the track 176 and identifying a particular sectored track portion 188, the magnetic-recording head 110*a* either reads data from the track 176, or writes data to, the track 176 depending on instructions received by the disk controller from an external agent, for example, a microprocessor of a computer system.

Figure 2A:
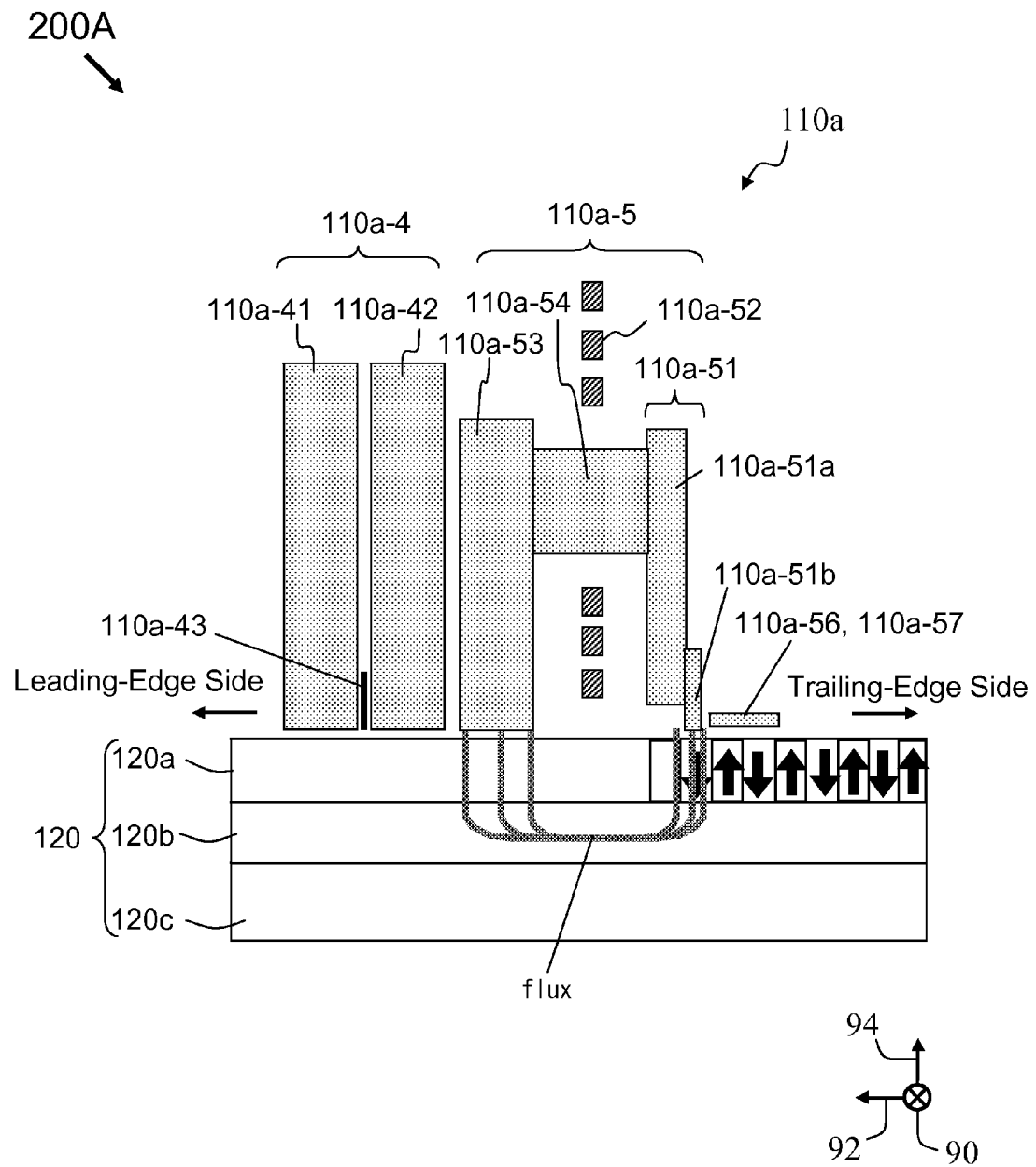
FIG. 2A is a cross-sectional view from a cross-section along line 2-2 of FIG. 1 of one example magnetic-recording head for the HDD of FIG. 1, in accordance with one or more embodiments of the present invention.

With reference now to FIG. 2A and further reference to FIG. 1, in accordance with one or more embodiments of the present invention, a cross-sectional view 200A is shown of a cross-section taken along line 2-2 of FIG. 1 of one example magnetic-recording head 110*a* that may be used in HDD 101. The triad of arrows 90, 92 and 94 indicates the orientation of the cross-sectional view 200A shown in FIG. 2A relative to the plan view 100 shown in FIG. 1. As shown in FIG. 2A, the example magnetic-recording head 110*a* includes a write element 110*a*-5 and a read element 110*a*-4 configured for perpendicular magnetic-recording (PMR). By way of example without limitation thereto, the example write element 110*a*-5 includes a trailing-edge write pole 110*a*-51, so-called because the write-pole 110*a*-51 is disposed on the side of the write element 110*a*-5 that faces towards the trailing-edge of the head-slider. The trailing-edge write pole 110*a*-51 includes a pole-tip portion 110*a*-51*b*, which is configured as a probe pole, and a yoke portion 110*a*-51*a* magnetically coupled to the pole-tip portion 110*a*-51*b*. As shown in FIG. 2A, two arrows indicate the relative directions of the tailing-edge and leading-edge sides of the head-slider, respectively. The write element 110*a*-5 also includes trailing-edge write-pole shields 110*a*-56 and 110*a*-57 that serve to shape the flux profile of the flux emanating from the pole-tip portion 110*a*-51*b*. In addition, the write element 110*a*-5 includes a return pole 110*a*-53, which closes the magnetic circuit of the write element 110*a*-5 along with the back gap portion 110*a*-54 for flux returning from the soft underlayer (SUL) 120*b* of the magnetic-recording disk 120. The write element 110*a*-5 also includes a coil 110*a*-52 that provides the magnetomotive force (mmf) to generate the flux that emanates from the pole-tip portion 110*a*-51*b* that alters the magnetization state of the magnetic-recording medium 120*a* of the magnetic-recording disk 120, a process referred to by the term of art, "writing data."

With further reference to FIGS. 1 and 2A, in accordance with one or more embodiments of the present invention, the flux emanating from the pole-tip portion 110*a*-51*b* writes a plurality of bits of information schematically indicated by the vertical arrows shown in the magnetic-recording medium 120*a*. As the direction of magnetization of bits of recorded data lies in a direction about perpendicular to the surface of the magnetic-recording disk, along the direction of the vector labeled by arrow 94, the term of art, "perpendicular magnetic-recording," or "PMR," is used to describe this method of magnetically recording information. As shown in FIG. 2A, the magnetic-recording disk 120 moves in the direction of the arrow labeled trailing-edge side, such that a sequence of bits is sequentially written to the magnetic-recording disk 120. The magnetic-recording head is relatively stationary with respect to the spinning magnetic-recording disk 120, except for the motion of the magnetic-recording in a nominally radial direction of the magnetic-recording disk 120, about parallel to the vector indicated by the tail of arrow 90, when seeking a track, for example, reading data from, or writing data to, track 176. The magnetic-recording disk 120 also includes a substrate 120*c* upon which SUL 120*b* and the magnetic-recording medium 120*a* are fabricated. Adjacent to the write element 110*a*-5 but on the side of write element facing the leading-edge of the head-slider, a read element 110*a*-4 of the magnetic-recording head 110*a* is disposed. The read element 110*a*-4 includes a first shield 110*a*-41 and a second shield 110*a*-42, as well as a sensor 110*a*-43 disposed between the first and second shields 110*a*-41 and 110*a*-42. Fringing flux emanating from the magnetic-recording medium 120*a* of the magnetic-recording disk is sensed by the sensor 110*a*-43, which generates a read signal in response to the fringing flux sensed by the sensor, a process referred to by the term of art, "reading data."

Figure 2B:
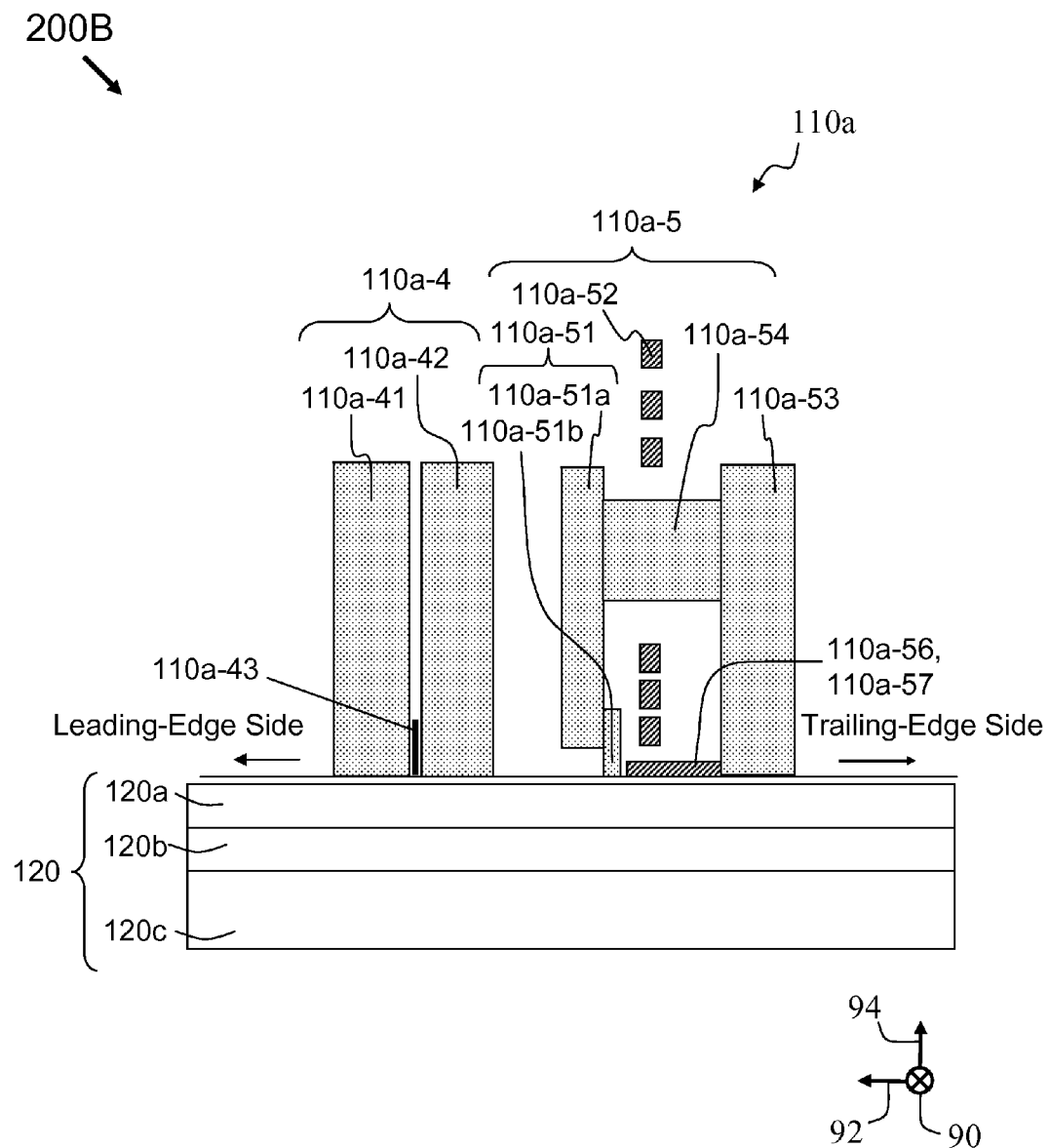
FIG. 2B is a cross-sectional view from a cross-section along line 2-2 of FIG. 1 of another example magnetic-recording head for the HDD of FIG. 1, in accordance with one or more embodiments of the present invention.

With reference now to FIG. 2B and further reference to FIG. 1, in accordance with one or more embodiments of the present invention, a cross-sectional view 200B is shown of a cross-section taken along line 2-2 of FIG. 1 of another example magnetic-recording head 110*a* that may be used in HDD 101. The triad of arrows 90, 92 and 94 indicates the orientation of the cross-sectional view 200B shown in FIG. 2B relative to the plan view 100 shown in FIG. 1. As shown in FIG. 2B, the other example magnetic-recording head 110*a* includes a write element 110*a*-5 and a read element 110*a*-4 also configured for PMR, but with a somewhat different configuration from that shown in FIG. 2A. By way of example without limitation thereto, the write element 110*a*-5 includes a leading-edge write pole 110*a*-51, so-called because the write-pole 110*a*-51 is disposed on the side of the write element 110*a*-5 that faces towards the leading-edge of the head-slider. The leading-edge write pole 110*a*-51 includes a pole-tip portion 110*a*-51*b*, which is configured as a probe pole, and a yoke portion 110*a*-51*a* magnetically coupled to the pole-tip portion 110*a*-51*b*. Similar to FIG. 2A, as shown in FIG. 2B, two arrows also indicate the relative directions of the tailing-edge and leading-edge sides of the magnetic-recording head 110*a*, respectively. The write element 110*a*-5 also includes trailing-edge write-pole shields 110*a*-56 and 110*a*-57 that serve to shape the flux profile of the flux emanating from the pole-tip portion 110*a*-51*b*. In addition, the other elements of the write element 110*a*-5 including the return pole 110*a*-53, the back gap portion 110*a*-54, and the coil 110*a*-52 function essentially in the same way as described in the discussion of FIG. 2A.

With further reference to FIGS. 1-2B, in accordance with one or more embodiments of the present invention, the magnetic-recording disk 120, similar to FIG. 2A, includes a substrate 120*c* upon which the SUL 120*b* and the magnetic-recording medium 120*a* are fabricated. Similar to FIG. 2A, adjacent to the write element 110*a*-5 but on the side of write element facing the leading-edge of the head-slider, a read element 110*a*-4 of the magnetic-recording head 110*a* is disposed. The read element 110*a*-4 includes a first shield 110*a*-41 and a second shield 110*a*-42, as well as a sensor 110*a*-43 disposed between the first and second shields 110*a*-41 and 110*a*-42 that function essentially in the same way as previously described in the discussion of FIG. 2A.

Figure 2C:
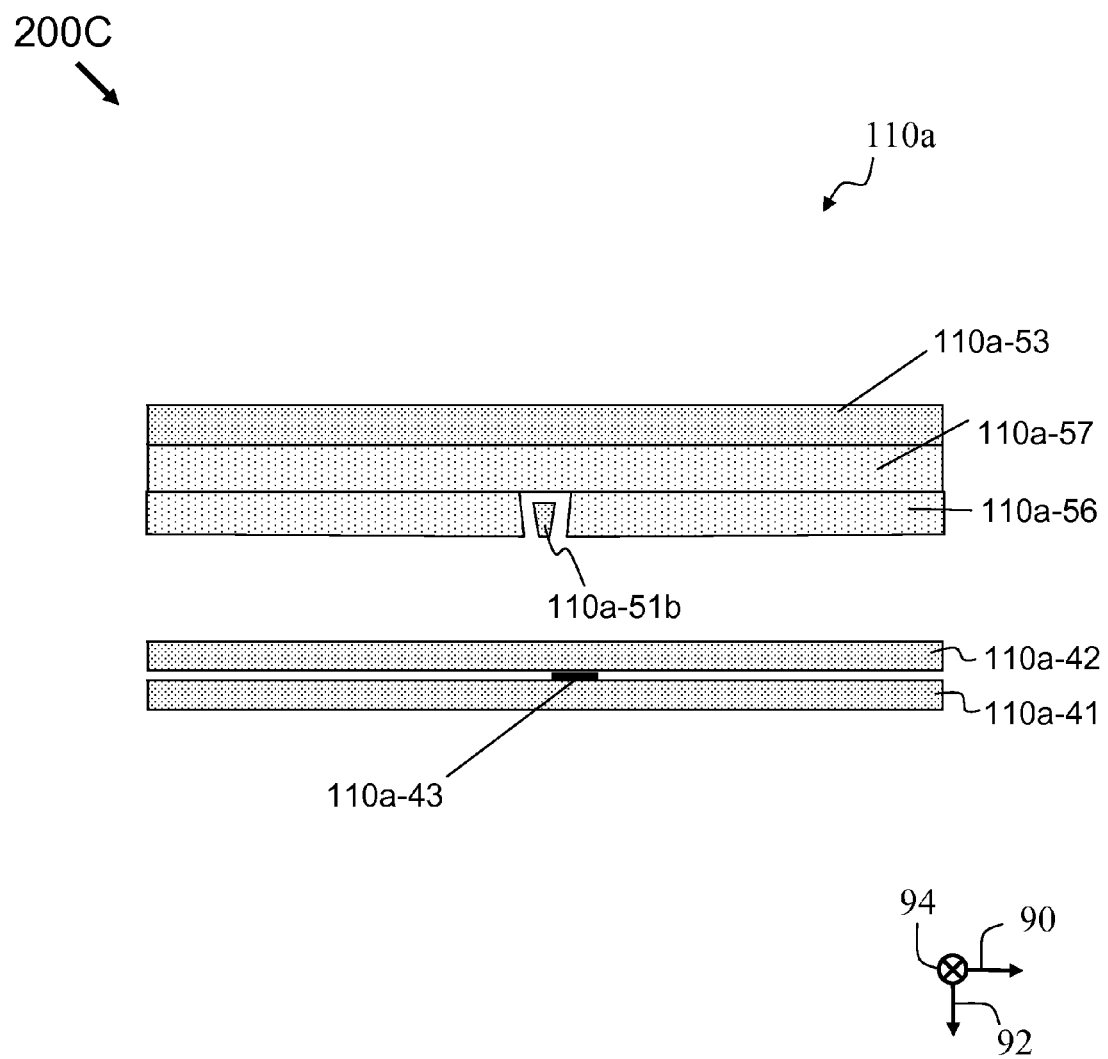
FIG. 2C is a plan view of the magnetic-recording head of FIG. 2B as viewed from the recording-surface of the magnetic recording disk, in accordance with one or more embodiments of the present invention.

With reference now to FIG. 2C and further reference to FIGS. 1 and 2B, in accordance with one or more embodiments of the present invention, a plan view 200C as viewed from the recording-surface of the magnetic recording disk 120 of HDD 101 of FIG. 1 is shown of the other example magnetic-recording head 110*a* of FIG. 2B that may be used in HDD 101. The triad of arrows 90, 92 and 94 indicates the orientation of the plan view 200C shown in FIG. 2C relative to the plan view 100 shown in FIG. 1. As shown in FIG. 2C, the sensor 110*a*-43 is sandwiched between the first shield 110*a*-41 and the second shield 110*a*-42. The shields 110*a*-41 and 110*a*-42 serve to shield the sensor from extraneous flux emanating from other locations on the magnetic-recording disk, somewhat like a collimator, which results in finer resolution in reading data from the magnetic-recording disk 120. In similar fashion, the pole-tip portion 110*a*-51*b* of the write pole 110*a*-51 is surrounded on three sides by the write-pole shields 110*a*-56 and 110*a*-57. The write-pole shields 110*a*-56 and 110*a*-57, similarly, provide finer resolution in writing data to the magnetic-recording disk 120. The pole-tip portion 110*a*-51*b* of the write pole 110*a*-51 has a trapezoidal shape, which along with the surrounding write-pole shields 110*a*-56 and 110*a*-57 serves to increase the field gradient used to write data to the magnetic-recording disk 120, which also provides finer resolution in writing data to the magnetic-recording disk 120. As shown in FIG. 2C, the sensor 110*a*-43 is offset slightly to the right of the pole-tip portion 110*a*-51*b* of the write-pole 110*a*-51 of the magnetic-recording head 110*a*. The offset allows for better alignment of the sensor 110*a*-43 of the read element 110*a*-4 with the same track that data is being written to by the pole-tip portion 110*a*-51*b* of the write-pole 110*a*-51 of the write element 110*a*-5, as for a "top" head, a term of art that is used to refer to magnetic-recording heads disposed on the top sides of magnetic-recording disks. A similar offset, but to the left, is present in "bottom" heads (not shown), a term of art that is used to refer to magnetic-recording heads disposed on the bottom sides of magnetic-recording disks.

Figure 2D:
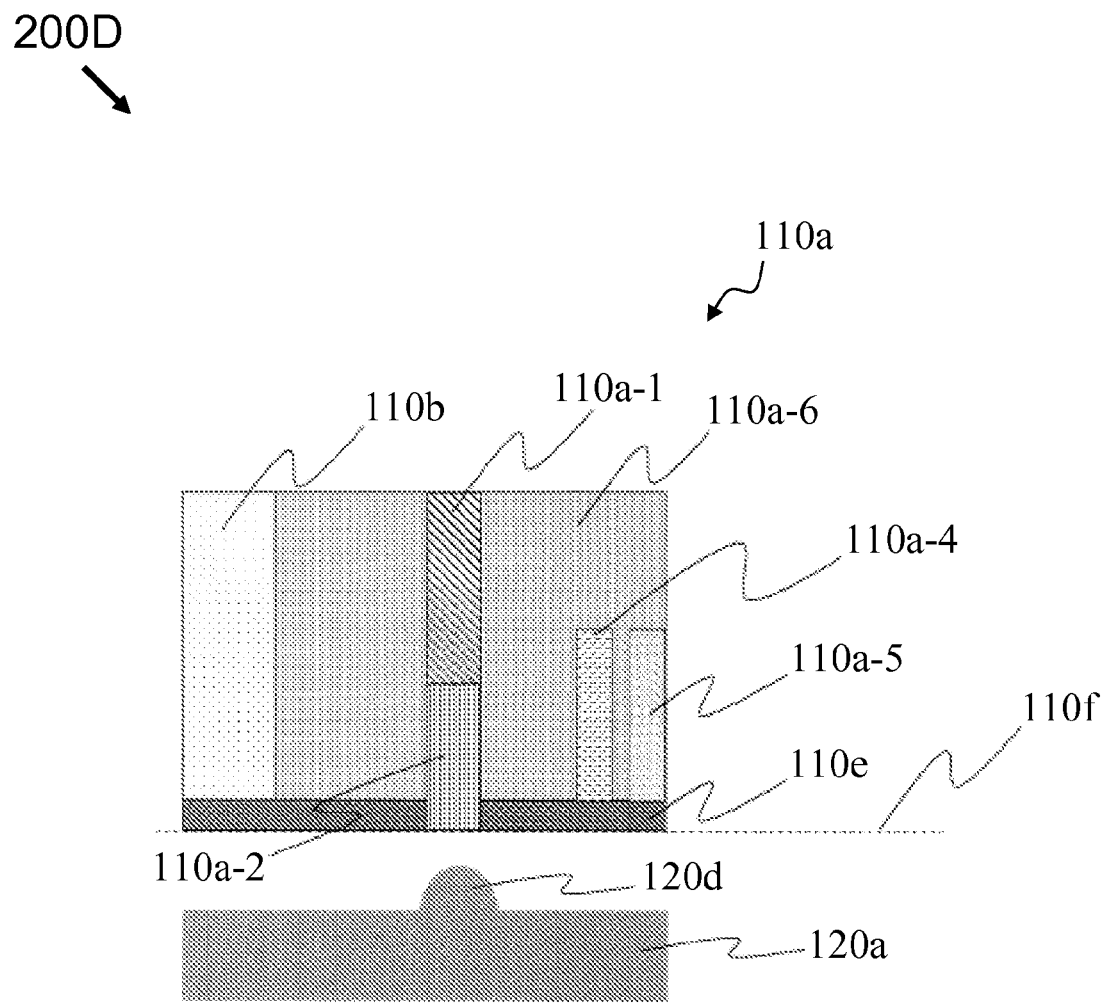
FIG. 2D is a cross-sectional view from a cross-section along line 2-2 of FIG. 1 of the magnetic-recording head, showing the touch-down detector incorporating a CNT, of the HDD of FIG. 1, in accordance with one or more embodiments of the present invention.

With reference now to FIG. 2D and further reference to FIG. 1, in accordance with one or more embodiments of the present invention, a cross-sectional view 200D is shown of a cross-section taken along line 2-2 of FIG. 1 of the magnetic-recording head 110*a*. The triad of arrows 90, 92 and 94 indicates the orientation of the cross-sectional view 200D shown in FIG. 2D relative to the plan view 100 shown in FIG. 1. As shown in FIG. 2D, the magnetic-recording head 110*a* is coupled to the slider 110*b*, and includes a write element 110*a*-5, a read element 110*a*-4, and a touch-down detector. As previously described in the discussion of FIG. 1, the write element 110*a*-5 is configured to write data to the magnetic-recording disk 120; and, similarly, the read element 110*a*-4 is configured to read data from the magnetic-recording disk 120. The touch-down detector includes a thermal sensor 110*a*-1, and a CNT portion 110*a*-2. The write element 110*a*-5, the read element 110*a*-4, and the touch-down detector are encapsulated in a non-magnetic filler material 110*a*-6, such as sputtered alumina. The thermal sensor 110*a*-1 is configured to convert heat to a voltage signal. The CNT portion 110*a*-2 is configured to touch down on the magnetic-recording disk 120. The CNT portion 110*a*-2 is also coupled to the thermal sensor 110*a*-1, and is configured to transfer heat generated by contact between the CNT portion 110*a*-2 and the magnetic-recording disk 120 to the thermal sensor 110*a*-1. The CNT portion 110*a*-2 is disposed at an ABS 110*f* of the magnetic-recording head 110*a*. The magnetic-recording head 110*a* also includes an overcoat layer 110*e* disposed on a disk-facing side of the magnetic-recording head 110*a*. A disk-facing side of the overcoat layer 110*e* defines a portion of the ABS 110*f*. The CNT portion 110*a*-2 is aligned along a vertical direction to the ABS 110*f*. The overcoat layer 110*e* has an aperture through which the CNT portion 110*a*-2 is configured to extend towards a surface of a magnetic-recording disk 120. The CNT portion 110*a*-2 may have a vertical dimension greater than or equal to a thickness of an overcoat layer 110*e* disposed on an ABS side of the magnetic-recording head 110*a*. However, in one embodiment of the present invention shown in FIG. 2D, the CNT portion 110*a*-2 has a vertical dimension greater than the thickness of the overcoat layer 110*e*.

With further reference to FIGS. 1 and 2D, in accordance with one or more embodiments of the present invention, the thermal sensor 110*a*-1 is disposed on a side of the magnetic-recording head 110*a* opposite to a side of the magnetic-recording head 110*a* where the ABS 110*f* is disposed. The CNT portion 110*a*-2 may include at least one CNT. The CNT portion 110*a*-2 may be a single-wall (SW) CNT, such that the SWCNT is oriented with its tube axis about perpendicular to an ABS 110*f* of the magnetic-recording head 110*a*. In an alternative embodiment of the present invention, the CNT portion 110*a*-2 may include a plurality of SWCNTs, such that the plurality of SWCNTs is arranged in a bundle and oriented with their tube axes about parallel to one another and perpendicular to an ABS 110*f* of the magnetic-recording head 110*a*.

The bundle of the plurality of SWCNTs may subtend a total area at the ABS 110f less than about ten square nanometers (nm$^2$).

With further reference to FIGS. 1 and 2D, in accordance with one or more embodiments of the present invention, the touch-down detector takes advantage of the unique and excellent thermal properties of a SWCNT with extremely high thermal conductivity along the axis of the tube, viz., 3500 Watt/meter/Kelvin (W/m/K), and negligible thermal conductivity perpendicular to the axis of the SWCNT. The thermal sensor 110a-1 is placed in a position away from the ABS 110f and the CNT portion 110a-2 is placed in between the thermal sensor 110a-1 and the ABS 110f. A part of the CNT portion 110a-2 disposed at the ABS 110f is surrounded by the carbon overcoat layer 110e. The CNT portion 110a-2 is deposited on the thermal sensor 110a-1 and vertically aligned on the surface of the thermal sensor 110a-1 facing the ABS 110f. The CNT portion 110a-2 is used to detect an asperity 120d at the surface of the magnetic-recording medium 120a of the magnetic-recording disk 120. For touch-down detection, the CNT portion 110a-2 is lowered down towards the surface of the magnetic-recording medium 120a; and, when CNT portion 110a-2 comes into contact with the asperity 120d, a certain amount of heat is generated due to the HDI at the location of asperity 120d, which may occur due to a collision between CNT portion 110a-2 and the asperity 120d. This heat that is transmitted through the CNT portion 110a-2 increases the temperature of the thermal sensor 110a-1. The resulting temperature change in the thermal sensor 110a-1 is detected in the form of a voltage change, which is next described.

With further reference to FIGS. 1 and 2D, in accordance with one or more embodiments of the present invention, the thermal sensor 110a-1 may include a thermocouple. The thermocouple includes a bimetallic structure, which is sufficiently sensitive to generate a voltage in response to heat transferred from the CNT portion 110a-2 to the thermal sensor 110a-1. In an alternative embodiment of the present invention, the thermal sensor 110a-1 may include a resistor. The resistor includes a single layer of resistive material that has a temperature coefficient of resistance sufficiently sensitive to change the resistance of the resistor in response to heat transferred from the CNT portion 110a-2 to the thermal sensor 110a-1.

Figure 3:
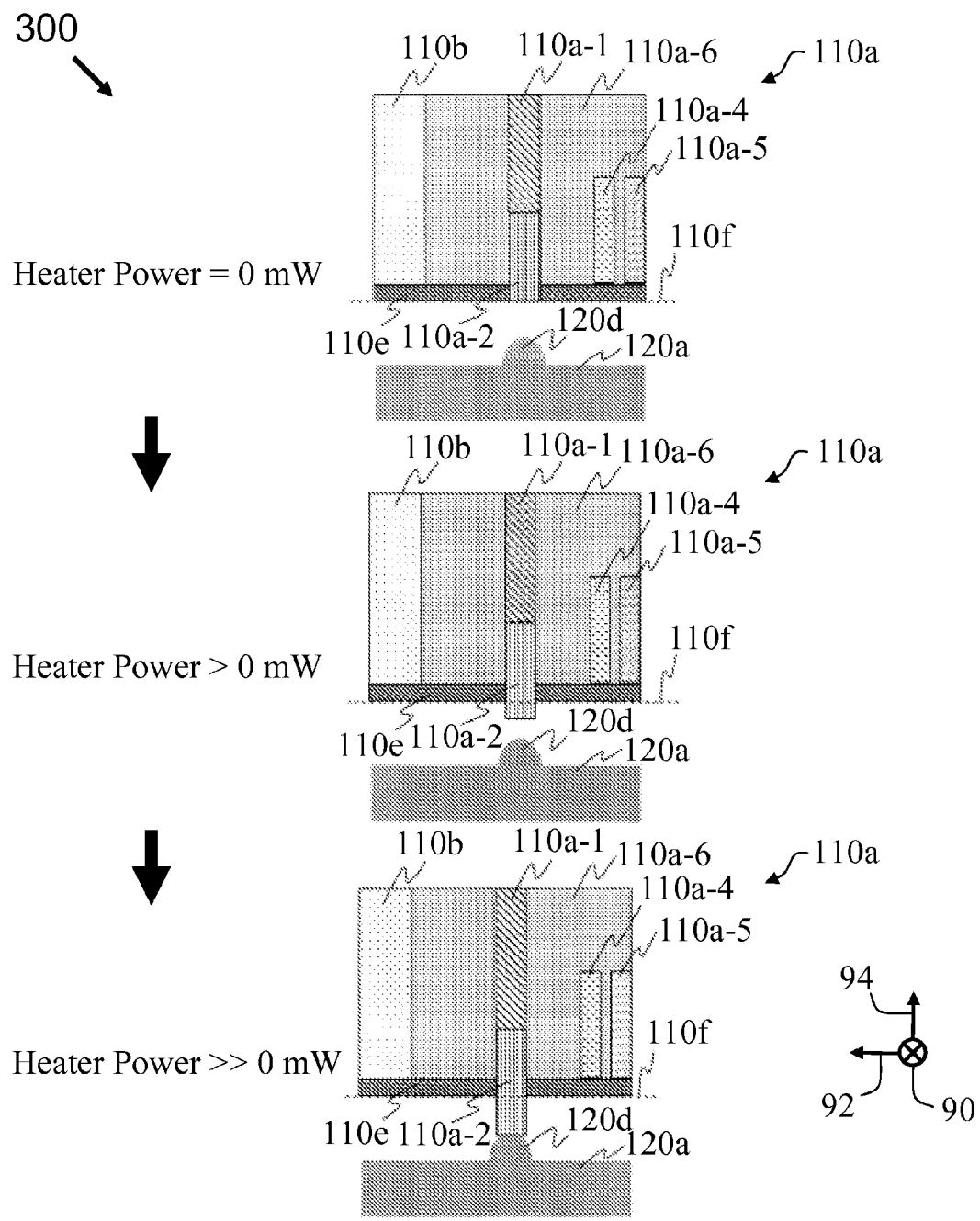
FIG. 3 are cross-sectional views from cross-sections along line 2-2 of FIG. 1 of the magnetic-recording head of the HDD of FIG. 1, which illustrate a touch down detection sequence using the touch-down detector incorporating a CNT, in accordance with one or more embodiments of the present invention.

With reference now to FIG. 3 and further reference to FIGS. 1 and 2D, in accordance with one or more embodiments of the present invention, cross-sectional views 300 from a cross-section along line 2-2 of FIG. 1 are shown of the magnetic-recording head 110a of HDD 101. The triad of arrows 90, 92 and 94 indicates the orientation of the cross-sectional views 300 shown in FIG. 3 relative to the plan view 100 shown in FIG. 1. FIG. 3 illustrates the working principle of the touch-down detector, and shows a touch down detection sequence using the touch-down detector incorporating at least one CNT. The basic principle is to bring the CNT portion 110a-2 close to the surface of the magnetic-recording medium 120a by expanding the thermal sensor 110a-1 towards the ABS 110f. A heater in the TFC element (not shown) of the magnetic-recording head 110a is generally used to control the fly-height of the read sensor and the writer. Heat produced by this heater due to a supply of power in the range of several milliwatts (mW) is used to expand the thermal sensor 110a-1 towards the ABS 110f. In the initial state, no power is provided to the heater as shown at the top of FIG. 3, labeled, "Heater Power=0 mW." With an increase of heater power, as shown in the middle of FIG. 3, labeled, "Heater Power>0 mW," the thermal sensor 110a-1 expands towards the ABS 110f and the CNT portion 110a-2 attached to the thermal sensor 110a-1 comes close to the asperity 120d. With further increase of heater power, as shown at the bottom of FIG. 3, labeled, "Heater Power>>0 mW," the thermal sensor 110a-1 expands further towards the ABS 110f, which makes the distance between the CNT portion 110a-2 and the asperity 120d smaller. For a certain value of heater power, as shown at the bottom of FIG. 3, CNT portion 110a-2 comes into contact with the asperity 120d. An HDI results that generates a certain amount of heat during the time of contact. Heat generated by the HDI at the location of asperity 120d between the CNT portion 110a-2 and asperity 120d readily flows through the CNT portion 110a-2 and is transferred to the thermal sensor 110a-1 resulting in a temperature rise at the location of the thermal sensor 110a-1. In one embodiment of the present invention, the thermal sensor 110a-1 may be made of a material whose electrical resistance is sensitive to the change in temperature, as discussed above. The local temperature rise in the thermal sensor 110a-1 due to the heat transferred through the CNT portion 110a-2 changes the electrical resistance of the thermal sensor 110a-1. This resistance change in thermal sensor 110a-1 can be converted to a voltage change; and thus, a touch-down detection signal is generated. The touch-down detector that produces the touch-down detection signal can have a variety of structures, as are next described.

Figure 4A:
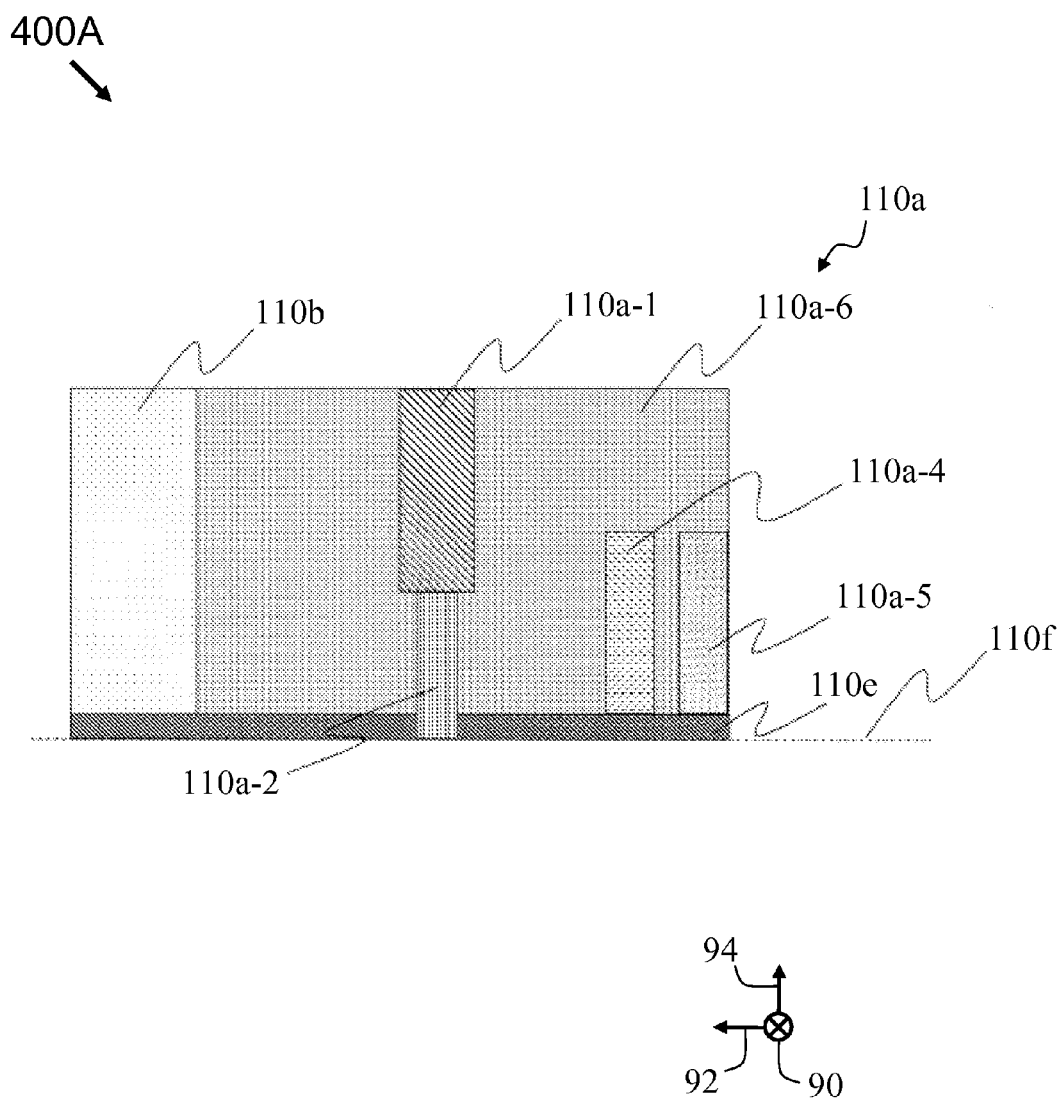
FIG. 4A is a cross-sectional view from a cross-section along line 2-2 of FIG. 1 of the magnetic-recording head of the HDD of FIG. 1, which illustrates one example structure of the touch-down detector as seen from the cross-track direction in which the width of the carbon-nano-tube portion along the down-track direction is less than that of the thermal sensor, in accordance with one or more embodiments of the present invention.
Figure 4B:
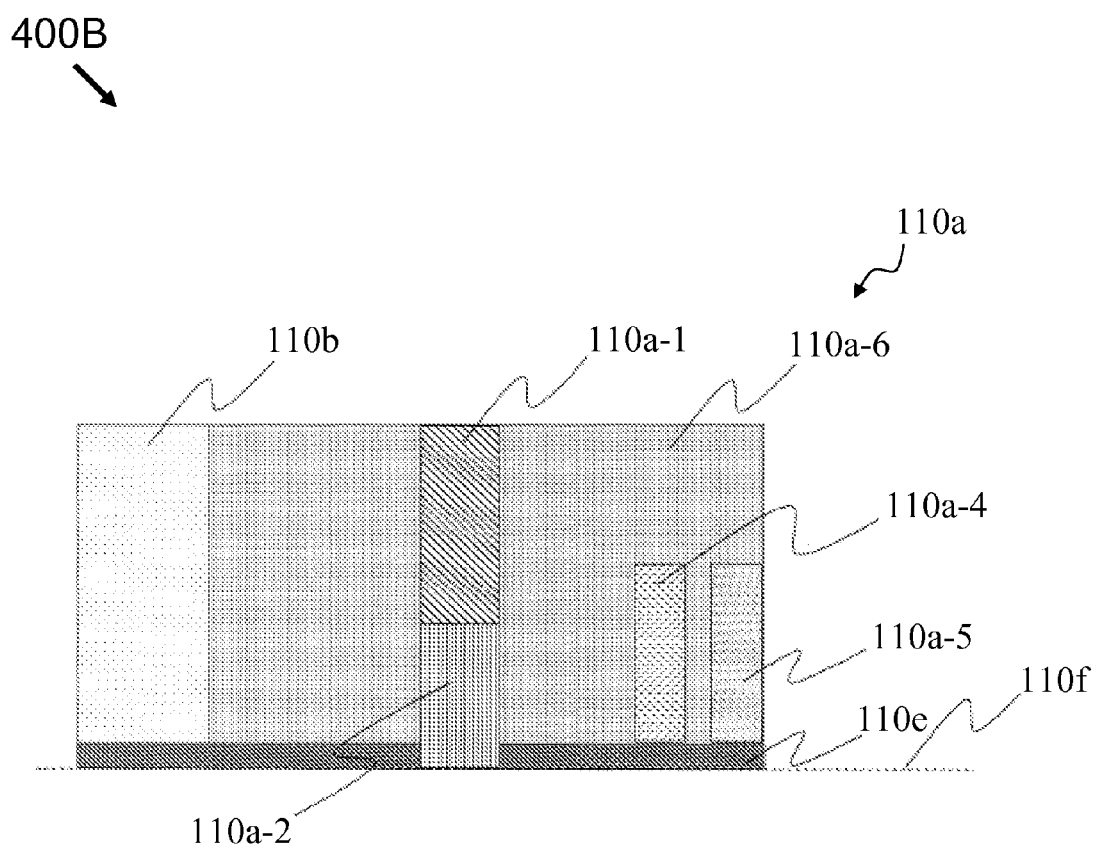
FIG. 4B is a cross-sectional view from a cross-section along line 2-2 of FIG. 1 of the magnetic-recording head of the HDD of FIG. 1, which illustrates another example structure of the touch-down detector as seen from the cross-track direction, in which the width of the carbon-nano-tube portion along the down-track direction is about equal to that of the thermal sensor, in accordance with one or more embodiments of the present invention.
Figure 4B:
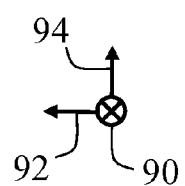

With reference now to FIGS. 4A and 4B, cross-sectional views 400A and 400B from a cross-section along line 2-2 of FIG. 1 are shown for two alternative embodiments of the present invention for the touch-down detector of the magnetic-recording head 110a of HDD 101. The triad of arrows 90, 92 and 94 indicates the orientation of the cross-sectional views 400A and 400B shown in FIGS. 4A and 4B, respectively, relative to the plan view 100 shown in FIG. 1. FIGS. 4A and 4B show the magnetic-recording head 110a as seen from the down-track direction, indicated by arrow 90. As shown in FIG. 4A, the width of the CNT portion 110a-2 along the down-track direction, indicated by arrow 92, is less than that of the thermal sensor 110a-1. In an alternative embodiment of the present invention, as shown in FIG. 4B, the width of the CNT portion 110a-2 along the down-track direction, indicated by arrow 92, is about equal to that of the thermal sensor 110a-1.

Figure 5A:
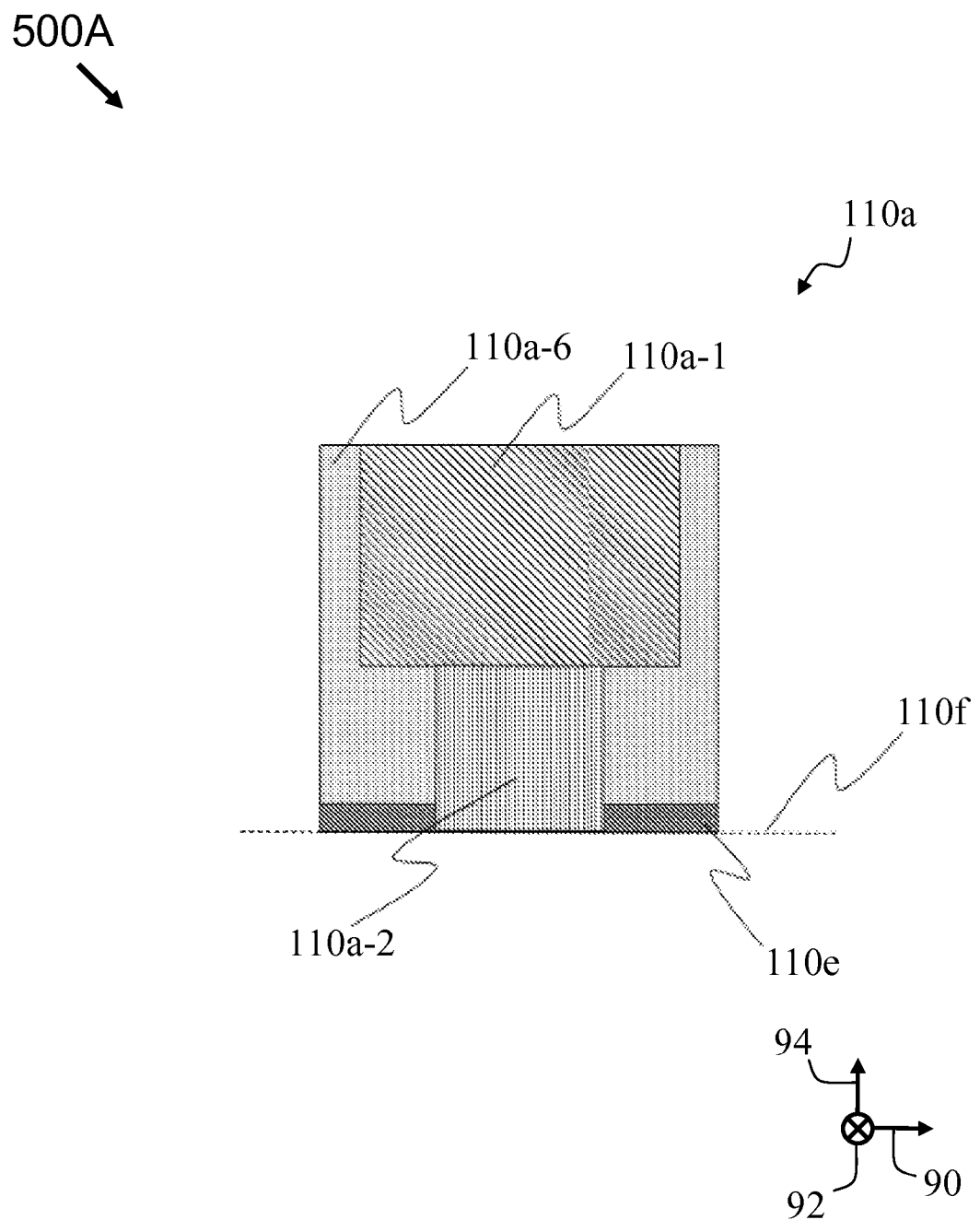
FIG. 5A is a cross-sectional view from a cross-section orthogonal to line 2-2 of FIG. 1 of the magnetic-recording head of the HDD of FIG. 1, which illustrates another example structure of the touch-down detector as seen from the down-track direction, in which the width of the carbon-nano-tube portion along the cross-track direction is less than that of the thermal sensor, in accordance with one or more embodiments of the present invention.
Figure 5B:
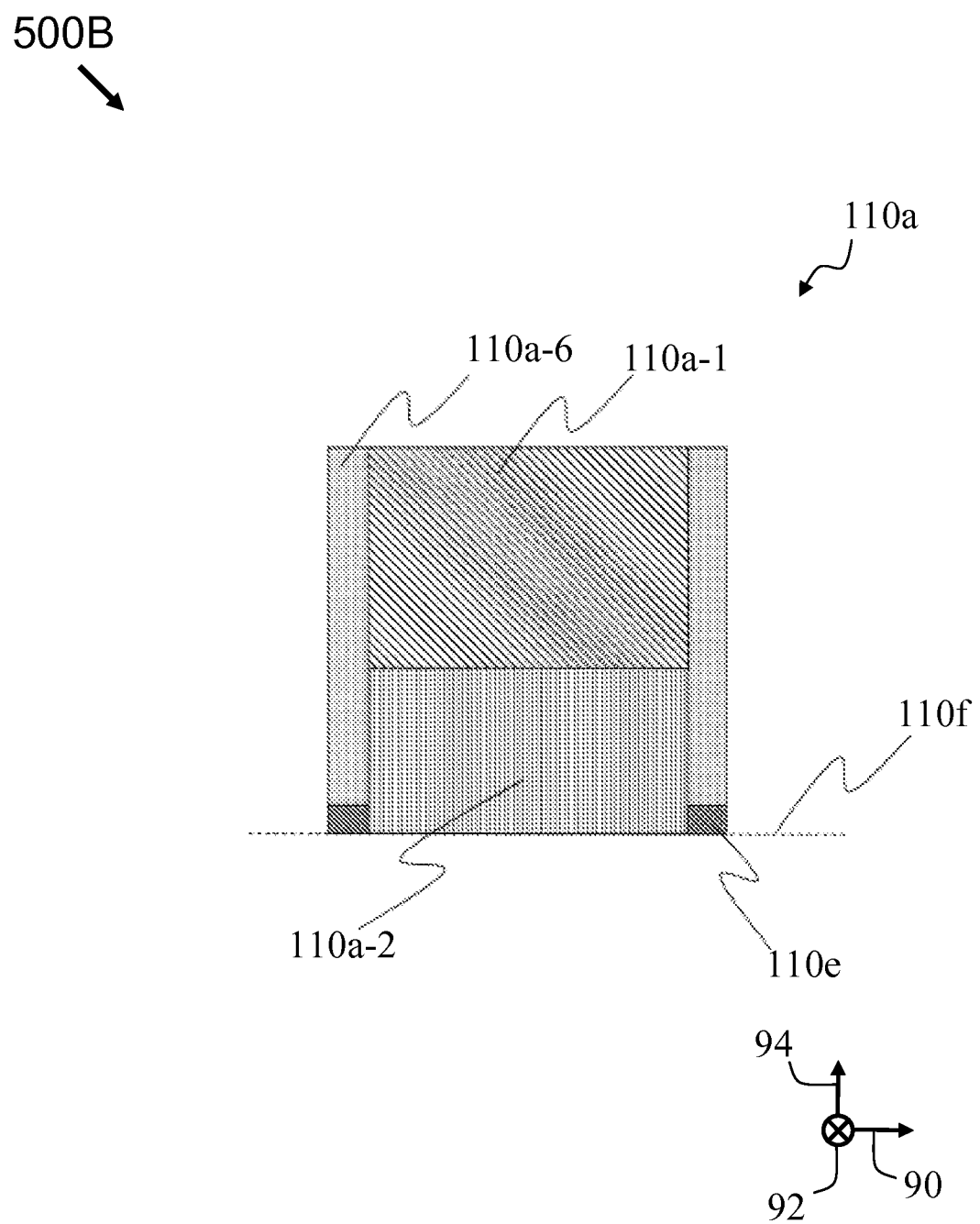
FIG. 5B is a cross-sectional view from a cross-section orthogonal to line 2-2 of FIG. 1 of the magnetic-recording head of the HDD of FIG. 1, which illustrates another example structure of the touch-down detector as seen from the down-track direction, in which the width of the carbon-nano-tube portion along the cross-track direction is about equal to that of the thermal sensor, in accordance with one or more embodiments of the present invention.

With reference now to FIGS. 5A and 5B, cross-sectional views 500A and 500B from a cross-section orthogonal to the line 2-2 of FIG. 1 are shown for two alternative embodiments of the present invention for the touch-down detector of the magnetic-recording head 110a of HDD 101. The triad of arrows 90, 92 and 94 indicates the orientation of the cross-sectional views 500A and 500B shown in FIGS. 5A and 5B, respectively, relative to the plan view 100 shown in FIG. 1. FIG. 5A and FIG. 5B show the structure of the touch-down detector as seen from the down-track direction, indicated by arrow 92. As shown in FIG. 5A, the length of the CNT portion 110a-2 along the cross-track direction, indicated by arrow 90, is less than that of thermal sensor 110a-1. In an alternative embodiment of the present invention, as shown in FIG. 5B, the length of the CNT portion 110a-2 along the cross-track direction, indicated by arrow 90, is about equal to that of thermal sensor 110a-1. Each of the arrangements along the down-track direction shown in FIGS. 4A and 4B can be combined with one or the other of the arrangements along the down-track direction shown in FIGS. 5A and 5B. On the other hand, the height of the CNT portion 110a-2 along the vertical, which is the direction perpendicular to the surface of the magnetic-recording medium 120a, indicated by arrow 94, can be about equal to that of the thickness of the overcoat layer 110e, as is next described.

Figure 6A:
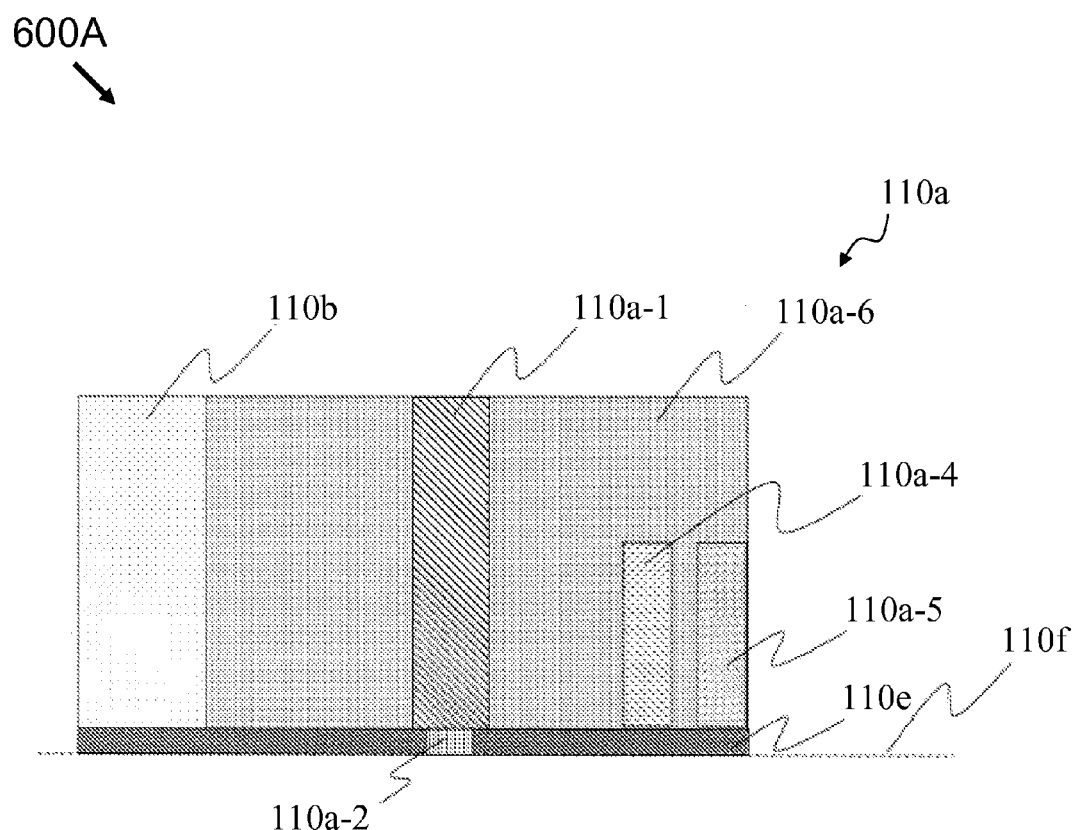
FIG. 6A is a cross-sectional view from a cross-section along line 2-2 of FIG. 1 of the magnetic-recording head of the HDD of FIG. 1, which illustrates another example structure of the touch-down detector as seen from the cross-track direction, in which the height of the carbon-nano-tube portion is about equal to that of the overcoat layer and in which the width of the carbon-nano-tube portion along the down-track direction is less than that of the thermal sensor, in accordance with one or more embodiments of the present invention.
Figure 6B:
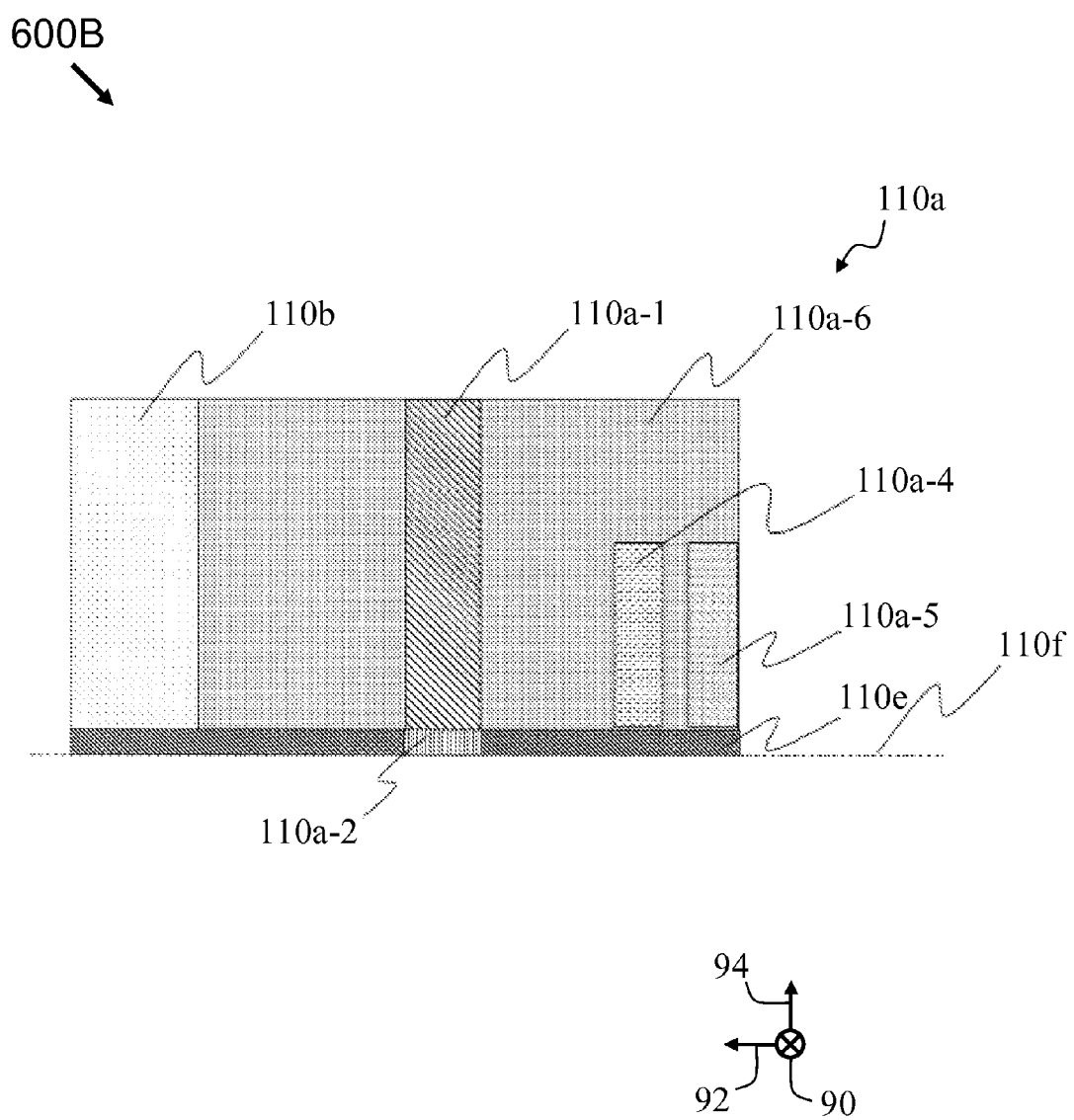
FIG. 6B is a cross-sectional view from a cross-section along line 2-2 of FIG. 1 of the magnetic-recording head of the HDD of FIG. 1, which illustrates another example structure of the touch-down detector as seen from the cross-track direction, in which the height of the carbon-nano-tube portion is about equal to that of the overcoat layer and in which the width of the carbon-nano-tube portion along the down-track direction is about equal to that of the thermal sensor, in accordance with one or more embodiments of the present invention.

With reference now to FIGS. 6A and 6B, cross-sectional views 600A and 600B from a cross-section along line 2-2 of FIG. 1 are shown for two alternative embodiments of the present invention for the touch-down detector of the magnetic-recording head 110a of HDD 101. The triad of arrows 90, 92 and 94 indicates the orientation of the cross-sectional views 600A and 600B shown in FIGS. 6A and 6B, respectively, relative to the plan view 100 shown in FIG. 1. FIGS. 6A and 6B show two embodiments of the present invention as seen from the down-track direction, indicated by arrow 90. For both the arrangements shown in FIGS. 6A and 6B, height of the CNT portion 110a-2 is shorter than the height of the thermal sensor 110a-1 along the vertical direction. Width of the CNT portion 110a-2 along the down-track direction, indicated by arrow 92, can be less than that of the thermal sensor 110a-1 as shown in FIG. 6A, or can be about equal to that of the thermal sensor 110a-1 as shown in FIG. 6B.

Figure 7A:
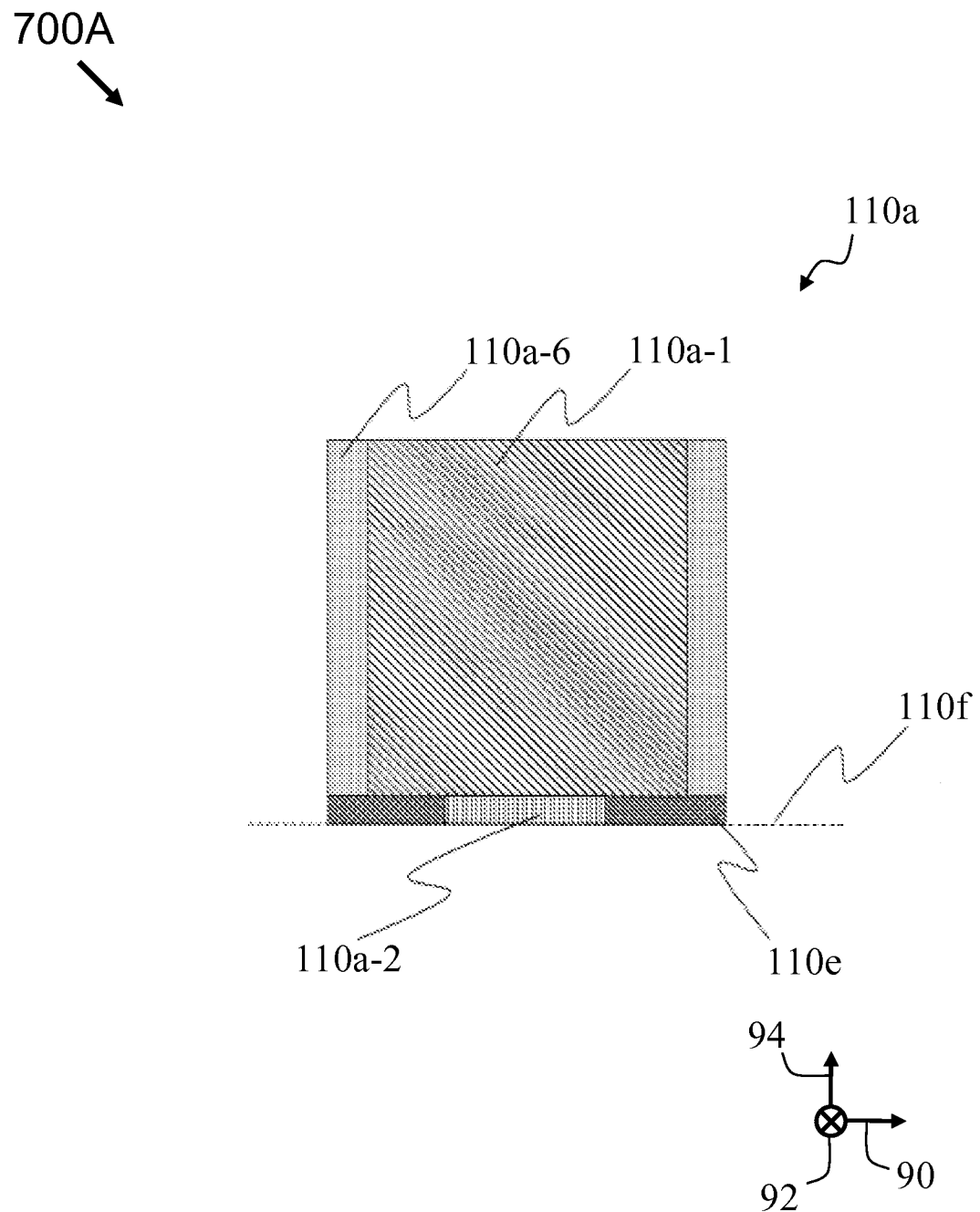
FIG. 7A is a cross-sectional view from a cross-section orthogonal to line 2-2 of FIG. 1 of the magnetic-recording head of the HDD of FIG. 1, which illustrates another example structure of the touch-down detector as seen from the down-track direction, in which the height of the carbon-nano-tube portion is about equal to that of the overcoat layer and in which the width of the carbon-nano-tube portion along the cross-track direction is less than that of the thermal sensor, in accordance with one or more embodiments of the present invention.
Figure 7B:
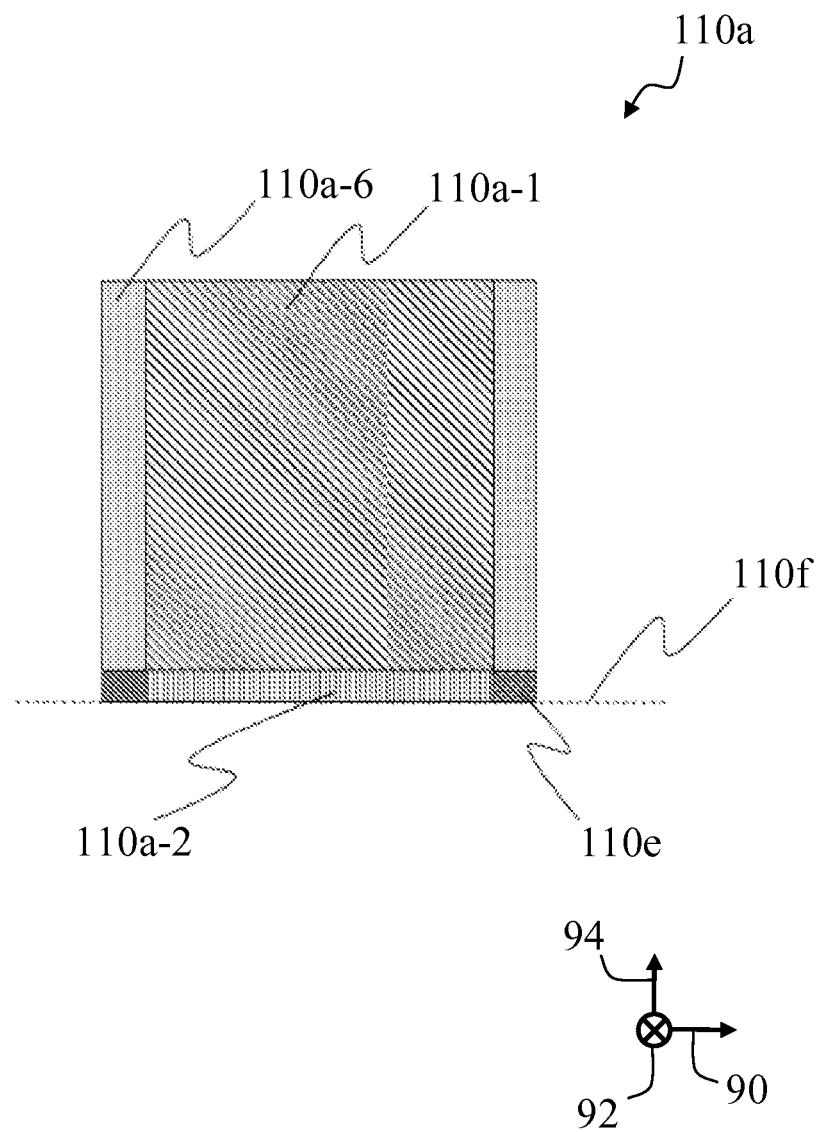
FIG. 7B is a cross-sectional view from a cross-section orthogonal to line 2-2 of FIG. 1 of the magnetic-recording head of the HDD of FIG. 1, which illustrates another example structure of the touch-down detector as seen from the down-track direction, in which the height of the carbon-nano-tube portion is about equal to that of the overcoat layer and in which the width of the carbon-nano-tube portion along the cross-track direction is about equal to that of the thermal sensor, in accordance with one or more embodiments of the present invention.

With reference now to FIGS. 7A and 7B, cross-sectional views 700A and 700B from a cross-section orthogonal to the line 2-2 of FIG. 1 are shown for two alternative embodiments of the present invention for the touch-down detector of the magnetic-recording head 110a of HDD 101. The triad of arrows 90, 92 and 94 indicates the orientation of the cross-sectional views 700A and 700B shown in FIGS. 7A and 7B, respectively, relative to the plan view 100 shown in FIG. 1. FIG. 7A and FIG. 7B show two arrangements of CNT portion 110a-2 and thermal sensor 110a-1 as seen from the down-track direction, indicated by arrow 92. Length of the CNT portion 110a-2 along the cross-track direction, indicated by arrow 90, can be shorter than that of the thermal sensor 110a-1 as shown in FIG. 7A, or can be similar to that of the thermal sensor 110a-1 as shown in FIG. 7B. Each of the arrangements along the down-track direction shown in FIGS. 6A and 6B can be combined with one or the other of the arrangements along the down-track direction shown in FIGS. 7A and 7B.

Figure 8:
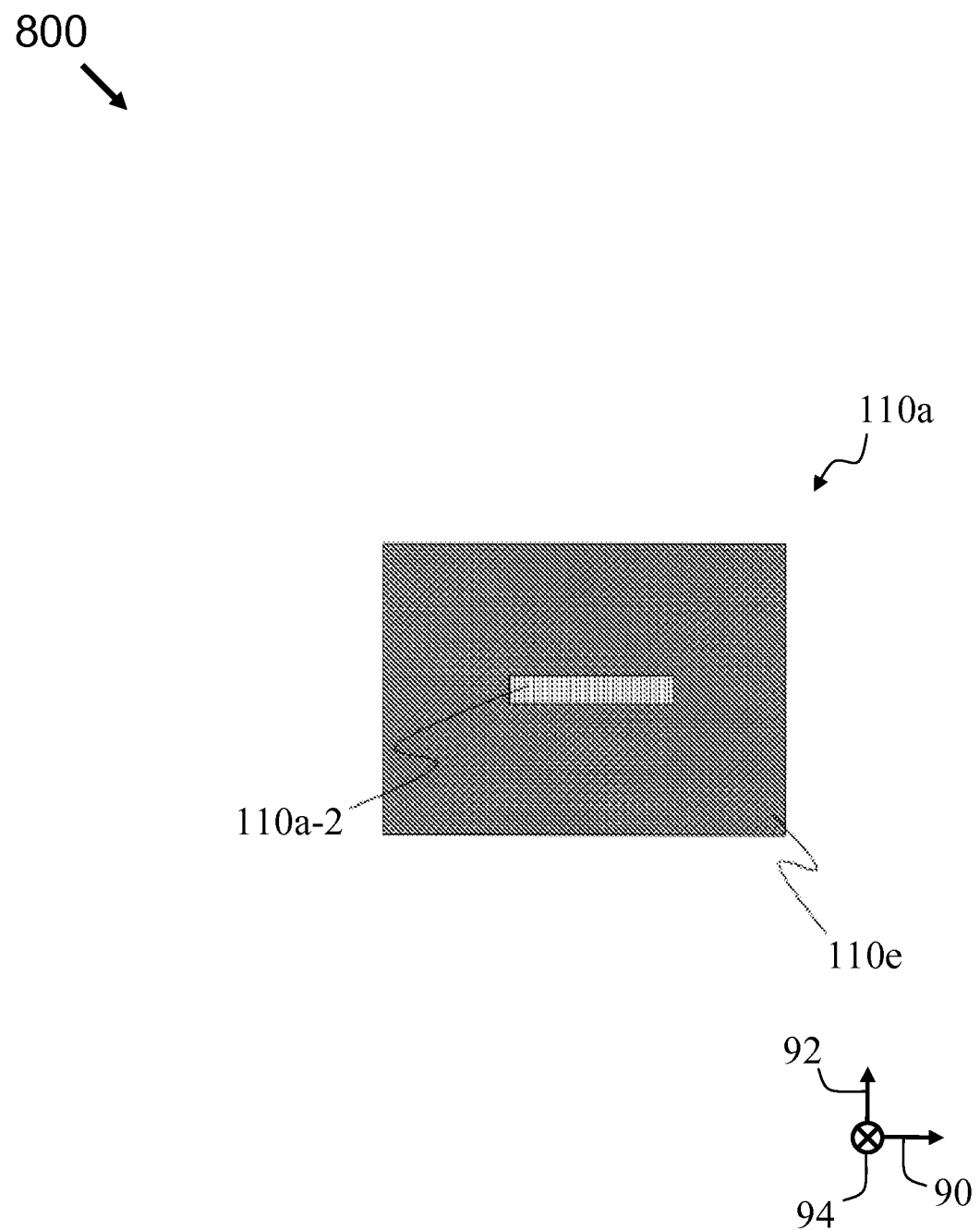
FIG. 8 is a plan view of the magnetic-recording head of the HDD of FIG. 1 as seen looking down onto the air-bearing surface (ABS), which illustrates one example structure of the carbon-nano-tube portion of the touch-down detector surrounded by the overcoat layer, in accordance with one or more embodiments of the present invention.

With reference now to FIG. 8, in accordance with one or more embodiments of the present invention, a plan view 800 is shown of the magnetic-recording head 110a of HDD 101, as seen looking down onto the ABS 110f. The triad of arrows 90, 92 and 94 indicates the orientation of the plan view 800 shown in FIG. 8 relative to the plan view 100 shown in FIG. 1. FIG. 8 illustrates one example structure of the CNT portion 110a-2 of the touch-down detector surrounded by the overcoat layer 110e.

In accordance with embodiments of the present invention, the thermal sensor 110a-1 as described above is configured to produce a large voltage change for a small change in its local temperature. In other words, the thermal sensor 110a-1 has low heat capacity to respond to the small amount of heat generated by the HDI between the CNT portion 110a-2 and the asperity 120d at the location of asperity 120d on the surface of the magnetic-recording medium 120a. Thin films including materials selected from the group consisting of Pt, Al, Ir, Ni, and NiFe can be used for the fabrication of the thermal sensor 110a-1. The thermal sensor 110a-1 can be deposited using sputtering, or electro-deposition. CNT portion 110a-2 can be deposited on metallic thermal sensor 110a-1 by chemical vapor deposition (CVD) or any other suitable process. In the CVD method, a metallic catalyst layer, which serves as a seed layer for CNT growth, can be deposited on the thermal sensor 110a-1 before the deposition of CNT portion 110a-2. The catalyst may be selected from the group of materials consisting of Ni, Co, and Mo.

In addition, in accordance with embodiments of the present invention, the aperture in the overcoat layer 110e may be fabricated by: first, depositing the CNT portion 110a-2 on the thermal sensor 110a-1 at the disk-facing side of the magnetic-recording head 110a; next, depositing the overcoat layer 110e on top of the CNT portion 110a-2; and then, sputter-etching away the excess overcoat-layer material on top of the CNT portion 110a-2. In an alternative embodiment of the present invention, the aperture in the overcoat layer 110e may be fabricated by: first, depositing the overcoat-layer 110e onto the disk-facing side of the magnetic-recording head 110a; next, ion milling the overcoat layer 110e to open up an aperture in the overcoat layer 110e at the location of the thermal sensor 110a-1; and then, depositing the CNT portion 110a-2 at the site of the aperture.

With reference now to FIG. 9 and further reference to FIG. 3, in accordance with one or more embodiments of the present invention, flowchart 900 is shown of a method for detecting contact between a magnetic-recording head and a recording surface of a magnetic-recording disk in a HDD. The method includes the following operations. At 910, power is supplied to a TFC element of the magnetic-recording head. At 920, a CNT portion of a touch-down detector is extended towards the recording surface of the magnetic-recording disk. At 930, the power supplied to the TFC element of the magnetic-recording head is increased, until the CNT portion makes contact with the recording surface of the magnetic-recording disk. At 940, heat is generated due to the contact between the CNT portion and the recording surface of the magnetic-recording disk. At 950, a portion of the heat is transferred along a body of the CNT portion to a thermal sensor coupled to the CNT portion. At 960, an electrical signal is generated by the thermal sensor to indicate contact with the recording surface of the magnetic-recording disk in response to the heat transferred to the thermal sensor by the CNT portion.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A magnetic-recording head with touch-down detector incorporating a carbon nano-tube, said magnetic-recording head comprising: a write element configured to write data to a magnetic-recording disk; a read element configured to read data from said magnetic-recording disk; an overcoat layer disposed on a disk-facing side of said magnetic-recording head, a disk-facing side of said overcoat layer defining a portion of an air-bearing surface, and said overcoat layer having an aperture through which a carbon-nano-tube portion is configured to extend towards a surface of a magnetic-recording disk, and a touch-down detector comprising: a thermal sensor configured to convert heat to a voltage signal; and said carbon-nano-tube portion configured to touch down on said magnetic-recording disk, said carbon-nano-tube portion coupled to said thermal sensor, and configured to transfer heat generated by contact between said carbon-nano-tube portion and said magnetic-recording disk to said thermal sensor.

2. The magnetic-recording head of claim 1, wherein said carbon-nano-tube portion is disposed at an air-bearing surface of said magnetic-recording head.

3. The magnetic-recording head of claim 2, wherein said thermal sensor is disposed on a side of said magnetic-recording head opposite to a side of said magnetic-recording head where said air-bearing surface is disposed.

4. The magnetic-recording head of claim 1, wherein said carbon-nano-tube portion comprises at least one carbon nano-tube, said carbon nano-tube having a diameter less than about one nanometer (nm).

5. The magnetic-recording head of claim 1, wherein said carbon-nano-tube portion comprises a single-wall carbon nano-tube, said single-wall carbon nano-tube oriented with its tube axis about perpendicular to an air-bearing surface of said magnetic-recording head.

6. The magnetic-recording head of claim 1, wherein said carbon-nano-tube portion comprises a plurality of single-wall carbon nano-tubes, said plurality of single-wall carbon nano-tubes arranged in a bundle and oriented with their tube axes about parallel to one another and perpendicular to an air-bearing surface of said magnetic-recording head.

7. The magnetic-recording head of claim 6, wherein said bundle of said plurality of single-wall carbon nano-tubes subtends a total area at said air-bearing surface less than about ten square nanometers ($nm^2$).

8. The magnetic-recording head of claim 1, wherein said carbon-nano-tube portion is aligned along a vertical direction to an air-bearing surface.

9. The magnetic-recording head of claim 1, wherein said thermal sensor comprises a thermocouple.

10. The magnetic-recording head of claim 9, wherein said thermocouple comprises a bimetallic structure, said bimetallic structure sufficiently sensitive to generate a voltage in response to heat transferred from said carbon-nano-tube portion to said thermal sensor.

11. The magnetic-recording head of claim 1, wherein said thermal sensor comprises a resistor.

12. The magnetic-recording head of claim 11, wherein said resistor comprises a single layer of resistive material, said resistive material having a thermal coefficient of resistance sufficiently sensitive to change the resistance of said resistor in response to heat transferred from said carbon-nano-tube portion to said thermal sensor.

13. The magnetic-recording head of claim 1, wherein said carbon-nano-tube portion has a vertical dimension greater than or equal to an overcoat layer disposed on an air-bearing-surface side of said magnetic-recording head.

14. A hard-disk drive having a magnetic-recording head with touch-down detector incorporating a carbon nano-tube, said hard-disk drive comprising:
a disk enclosure;
a spindle motor mounted in a disk-enclosure base of said disk enclosure;
a spindle coupled to said spindle motor;
at least one magnetic-recording disk rotatably mounted on said spindle; and
at least one a magnetic-recording head comprising:
a write element configured to write data to a magnetic-recording disk;
a read element configured to read data from said magnetic-recording disk; and
a touch-down detector comprising:
a thermal sensor configured to convert heat to a voltage signal; and
a carbon-nano-tube portion configured to touch down on said magnetic-recording disk, said carbon-nano-tube portion coupled to said thermal sensor, and configured to transfer heat generated by contact between said carbon-nano-tube portion and said magnetic-recording disk to said thermal sensor, wherein said carbon-nano-tube portion as a vertical dimension greater than or equal to an overcoat layer disposed on an air-bearing-surface side of said magnetic-recording head.

15. The hard-disk drive of claim 14, wherein said carbon-nano-tube portion is disposed at an air-bearing surface of said magnetic-recording head.

16. The hard-disk drive of claim 15, wherein said thermal sensor is disposed on a side of said magnetic-recording head opposite to a side of said magnetic-recording head where said air-bearing surface is disposed.

17. The hard-disk drive of claim 14, wherein said carbon-nano-tube portion comprises at least one carbon nano-tube.

18. The hard-disk drive of claim 14, wherein said carbon-nano-tube portion is aligned along a vertical direction to an air-bearing surface.

19. The hard-disk drive of claim 14, wherein said thermal sensor comprises a thermocouple.

20. The hard-disk drive of claim 19, wherein said thermocouple comprises a bimetallic structure, said bimetallic structure sufficiently sensitive to generate a voltage in response to heat transferred from said carbon-nano-tube portion to said thermal sensor.

21. The hard-disk drive of claim 14, wherein thermal sensor comprises a resistor.

22. The hard-disk drive of claim 21, wherein said resistor comprises a single layer of resistive material, said resistive material having a thermal coefficient of resistance sufficiently sensitive to change the resistance of said resistor in response to heat transferred from said carbon-nano-tube portion to said thermal sensor.

* * * * *